United States Patent
Hughes et al.

(10) Patent No.: US 7,058,791 B1
(45) Date of Patent: Jun. 6, 2006

(54) ESTABLISHING A MODE INDICATION RESPONSIVE TO TWO OR MORE INDICATIONS

(75) Inventors: William A. Hughes, Burlingame, CA (US); Kevin J. McGrath, Los Gatos, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 992 days.

(21) Appl. No.: 09/824,988

(22) Filed: Apr. 2, 2001

Related U.S. Application Data

(60) Provisional application No. 60/224,368, filed on Aug. 9, 2000.

(51) Int. Cl.
*G06F 9/44* (2006.01)

(52) U.S. Cl. .......................................... 712/43; 712/229
(58) Field of Classification Search ................. 712/43, 712/229
See application file for complete search history.

(56) References Cited

U.S. PATENT DOCUMENTS

| | | |
|---|---|---|
| 4,620,274 A | 10/1986 | Boothroyd, et al. |
| 4,682,284 A | 7/1987 | Schrofer |
| 4,701,946 A | 10/1987 | Oliva, et al. |
| 4,868,740 A | 9/1989 | Kagimasa, et al. |
| 5,381,537 A | 1/1995 | Baum, et al. |
| 5,479,627 A | 12/1995 | Khalidi et al. |
| 5,481,684 A | 1/1996 | Richter, et al. |
| 5,517,651 A | 5/1996 | Huck, et al. |
| 5,617,554 A | 4/1997 | Alpert, et al. |
| 5,644,755 A | 7/1997 | Wooten |
| 5,692,167 A | 11/1997 | Grochowski, et al. |
| 5,758,116 A | 5/1998 | Lee, et al. |
| 5,774,686 A | 6/1998 | Hammond, et al. |
| 5,784,638 A | 7/1998 | Goetz, et al. |
| 5,787,495 A | 7/1998 | Henry, et al. |
| 5,826,074 A | 10/1998 | Blomgren |
| 6,021,484 A | 2/2000 | Park |
| 6,031,992 A | 2/2000 | Cmelik, et al. |
| 6,086,623 A | 7/2000 | Broome, et al. |
| 6,418,524 B1 * | 7/2002 | Van Dyke et al. .......... 711/208 |

OTHER PUBLICATIONS

Turley, James L. Advanced 80386 Programming Techniques. Berkely, California: 1988. Chapters 1, 4, 5, and 8.*

(Continued)

*Primary Examiner*—Eddie Chan
*Assistant Examiner*—Aimee Li
(74) *Attorney, Agent, or Firm*—Lawrence J. Merkel; Meyertons, Hood, Kivlin, Kowert & Goetzel, P.C.

(57) ABSTRACT

A processor generates a mode indication based on two or more other indications. The mode indication is indicative of whether or not a particular mode is active in the processor. Each indication is stored in a storage location which is addressable via a different instruction. In one embodiment, a long mode in which a 64 bit operating mode is selectable in addition to 32 bit and 16 bit modes may be activated via a long mode active indication. The long mode active indication may be generated by the processor, and may indicate that long mode is active if paging is enabled and a long mode enable indication indicates that long mode is enabled. In this manner, long mode may be activated after paging is enabled (with a set of long mode page tables indicated by the page table base address).

57 Claims, 15 Drawing Sheets

OTHER PUBLICATIONS

The American Heritage® Dictionary of the English Language. Fourth Edition ©2000. www.dictionary.com Search terms: emulate; network; modem.*

Intel, "Intel Architecture Software Developer's Manual, vol. 1: Basic Architecture," 1997, pp. 3-1-3-15.

Intel, "Pentium Pro Family Developer's Manual, vol. 3: Operating System Writer's Guide," 1996, pp. 2-1-2-21, 3-1-3-33, and 4-1-4-29.

*The Technology Behind Crusoe™ Processors, Low-Power x86-Compatible Processors Implemented with Code Morphing™ Software*, Transmeta Corporation, Jan. 2000, pp. 1-18.

*Alpha Learns to Do Windows; Digital's FX!32 is The Key To Running Win32 Software on Alpha/Windows NT.*, Selinda Chiquoine, BYTE, Aug. 4, 1998, 4 pages.

*Awards Stack Up for DIGITAL FX!32 Windows Compatibility Software for ALPHA*, DIGITAL Press Releases, Dec. 11, 1997, 7 pages.

*DIGITAL FX!32; White Paper: How DIGITAL FX!32 Works*, DIGITAL Semiconductor, Jan. 26, 1998, 4 pages.

*An Alpha in PC Clothing; Digital Equipment's New x86 Emulator Technology Makes An Alpha System a Fast x86 Clone*, Tom Thompson, BYTE, Aug. 4, 1998, 7 pages.

*AMD 64-Bit Technology; The AMD x86 Architecture Programmers Overview*, AMD, Publication #24108 Rev: A, Aug. 2000. pp. 1-106.

*AMD 64-Bit Technology; The AMD x86-64 Architecture Programmers Overview*, AMD, Pulication #24108 Rev: C, Jan. 2001, pp. 1-128.

Jerry M. Rosenberg, Ph.D., "Dictionary of Computers, Information Processing, and Telecommunications," 2nd Edition, John Wiley & Sons 1984 & 1987, pp. 256, 377, 526 and 592.

James l. Turley, "Advanced 80386 Programming Techniques," 1988 Chapters 1, 4, 5, 8 and Appendix C.

"Pentium Processor Family Developers Manual," vol. 3, Architecture and Programming Manual, Intel, 1995, pp. 3-1 to 3-24, 10-1 to 10-13, 11-1 to 11-25.

"Advanced 80386 Programming Techniques,"James L. Turley, Osborne McGraw-Hill, Berkeley, CA, 1988. pp. 45-84 and 283-315.

* cited by examiner

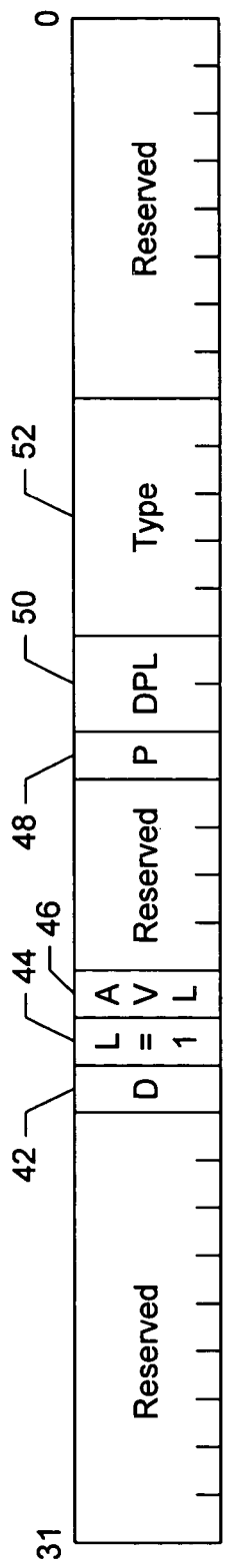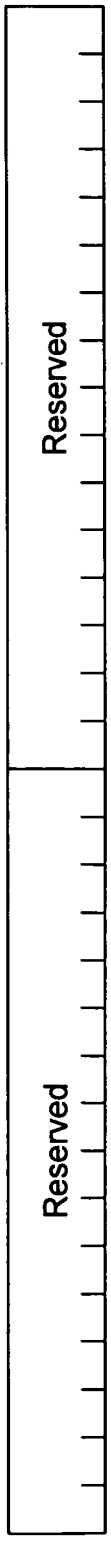
Fig. 2
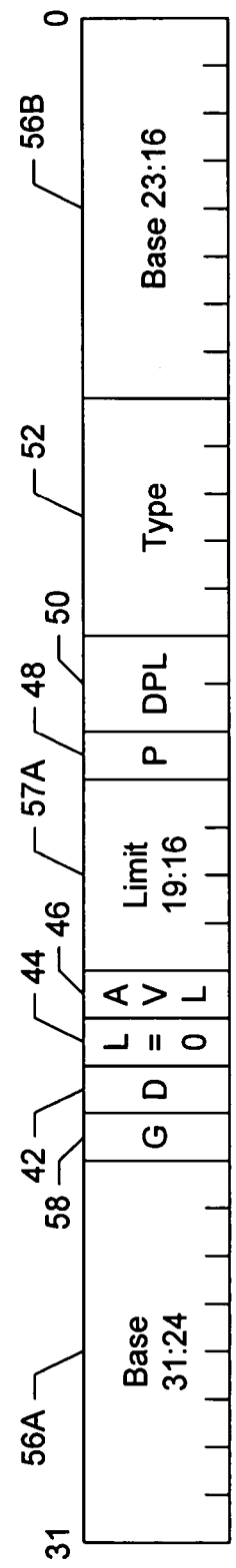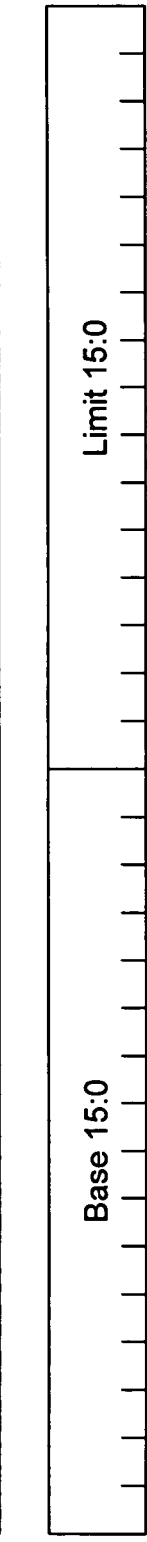
Fig. 3

| LMA | CS L Bit | CS D Bit | Operating Mode |
|---|---|---|---|
| 0 | x | 0 | 16 Bit Mode |
| 0 | x | 1 | 32 Bit Mode |
| 1 | 0 | 0 | 16 Bit Compatibility Mode |
| 1 | 0 | 1 | 32 Bit Compatibility Mode |
| 1 | 1 | 0 | 32/64 Mode |
| 1 | 1 | 1 | Reserved |

| Override Prefix | | None | REX | (66H, 67H) |
|---|---|---|---|---|
| 32/64 Mode | Operand Size | 32 bits | 64 bits | 16 bits |
| | Address Size | 64 bits | DNA | 32 bits |
| 32 Bit Mode Incl. Compatibility Mode | Operand Size | 32 bits | DNA | 16 bits |
| | Address Size | 32 bits | DNA | 16 bits |
| 16 Bit Mode Incl. Compatibility Mode | Operand Size | 16 bits | DNA | 32 bits |
| | Address Size | 16 bits | DNA | 32 bits |

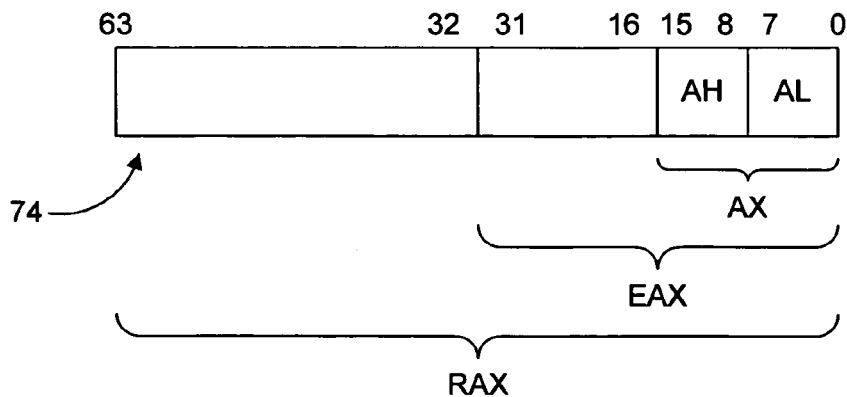

Fig. 7

| Change | Check |
|---|---|
| LME 0 → 1 | If PG=1 then exception |
| LME 1 → 0 | If PG=1 then exception |
| PG 0 → 1 | If LME=1 and PAE=0 then exception |
| PAE 1 → 0 | If LMA=1 then exception |

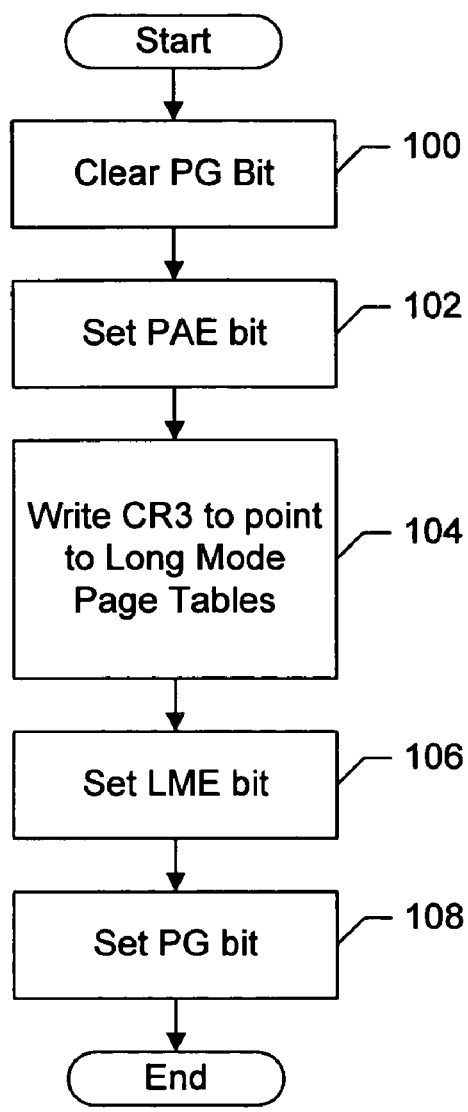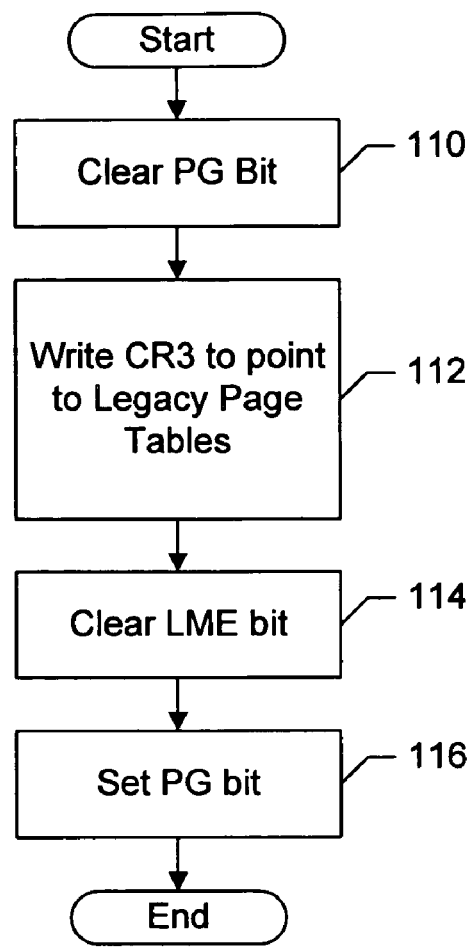
Fig. 10
Fig. 11

ESTABLISHING A MODE INDICATION RESPONSIVE TO TWO OR MORE INDICATIONS

This application claims benefit of priority to Provisional Application Ser. No. 60/224,368 filed Aug. 9, 2000.

BACKGROUND OF THE INVENTION

1. Field of the Invention

This invention is related to the field of processors and, more particularly, to setting mode indications in a processor architecture.

2. Description of the Related Art

Processor architectures often provide a variety of modes, typically programmable in configuration registers and/or memory locations read by the processor during operation. The selected mode generally controls the operation of certain aspects of the processor, as defined by the processor architecture. Other modes may cause different operation in those aspects.

As the processor architecture evolves, it may be desirable to add new modes. Sometimes, as these new modes are added, it is difficult to reliably establish the mode during operation of a processor implementing the architecture. The difficulty may arise from interactions between the mode and other, previously defined modes, or may arise from a different definition of the previously defined modes when the newly defined mode is established. As the processor is transitioned from one mode to another, it is frequently necessary to minimize the activity occurring in the processor to eliminate undefined states from occurring as the mode change takes effect.

Unfortunately, in some circumstances, it may be impossible to eliminate the undefined states. In such cases, the newly defined mode may not be implementable (limiting the ability of the processor architecture to be extended), or one of the previously defined modes may have to be changed or eliminated (which may reduce compatibility with previous processors which implemented the architecture). Also, many of the combinations of the newly defined mode and the previously defined modes may not be useful, but supporting all of the combinations may complicate implementation of the processor architecture. Complicating the implementation merely to allow all combinations of newly defined modes and previously defined modes is undesirable.

SUMMARY OF THE INVENTION

The problems outlined above are in large part solved by a processor as described herein. The processor generates a mode indication based on two or more other indications. The mode indication is indicative of whether or not a particular mode is active in the processor. Each indication is stored in a storage location which is addressable via a different instruction. By generating the mode indication based on the values of the two or more indications, undefined states in which the mode is active and the two or more indications are not in defined states for that mode may be eliminated. Furthermore, undesirable (e.g. non-useful) combinations of indications while the mode is active may also be avoided.

In one embodiment, a long mode in which a 64 bit operating mode is selectable in addition to 32 bit and 16 bit modes may be activated via a long mode active indication. The long mode active indication may be generated by the processor, and may indicate that long mode is active if paging is enabled and a long mode enable indication indicates that long mode is enabled. In this manner, long mode may be activated after paging is enabled (with a set of long mode page tables indicated by the page table base address). Additionally, long mode may only be active when paging is enabled, eliminating a state of the processor in which long mode is active but paging is disabled.

Broadly speaking, an apparatus is contemplated, comprising first, second, and third storage locations and a processor. The first storage location is configured to store a first indication. The first storage location addressable by a first instruction defined by a processor architecture. The second storage location is configured to store a second indication. The second storage location is addressable by a second instruction defined by the processor architecture, and the second instruction is different from the first instruction. The third storage location is configured to store a mode indication indicative of whether or not a first mode defined in the processor architecture is active. The processor is configured to generate the mode indication responsive to the first indication and the second indication.

Additionally, a processor is contemplated comprising a first register configured to store a first indication; a second register configured to store a second indication; and a circuit coupled to the first register and the second register. The first register is addressable by a first instruction, and the second register is addressable by a second instruction different from the first instruction. The circuit is configured to generate a mode indication responsive to the first indication and the second indication, wherein the mode indication is indicative of whether or not a first mode defined in a processor architecture of the processor is active.

Moreover, a method is contemplated. A first indication is stored in a first storage location addressable by a first instruction and a second indication is stored in a second storage location addressable by a second instruction. A mode indication indicative of whether or not a first mode defined in a processor architecture is active is generated responsive to the first indication and the second indication.

Still further, a carrier medium carrying a set of instructions for activating a first mode in a processor is contemplated. The set of instructions includes: a first one or more instructions to update a first indication to indicate that physical address extension is enabled; a second one or more instructions to update a page table base register to point to a set of page tables; a third one or more instructions to update an enable indication to an enabled state; and a fourth one or more instructions to update a paging indication to indicate that paging is enabled.

Additionally, a carrier medium carrying a set of instructions for deactivating a first mode in a processor is contemplated. The set of instructions includes: a first one or more instructions to update a paging indication to indicate that paging is disabled; a second one or more instructions to update a page table base register to point to a set of page tables; and a third one or more instructions to update an enable indication to a disabled state.

BRIEF DESCRIPTION OF THE DRAWINGS

Other objects and advantages of the invention will become apparent upon reading the following detailed description and upon reference to the accompanying drawings in which:

FIG. 2 is a block diagram of one embodiment of a segment descriptor for 32/64 mode.

FIG. 3 is a block diagram of one embodiment of a segment descriptor for compatibility mode.

FIG. 5 is a table illustrating one embodiment of operating modes as a function of segment descriptor and control register values.

FIG. 6 is a table illustrating one embodiment of the use of instruction prefixes to override default operating modes.

FIG. 7 is a block diagram of one embodiment of a register.

FIG. 9 is a table illustrating one embodiment of consistency checks.

FIG. 10 is a flowchart illustrating one embodiment of entering long mode.

FIG. 11 is a flowchart illustrating one embodiment of exiting long mode.

Figure 1:
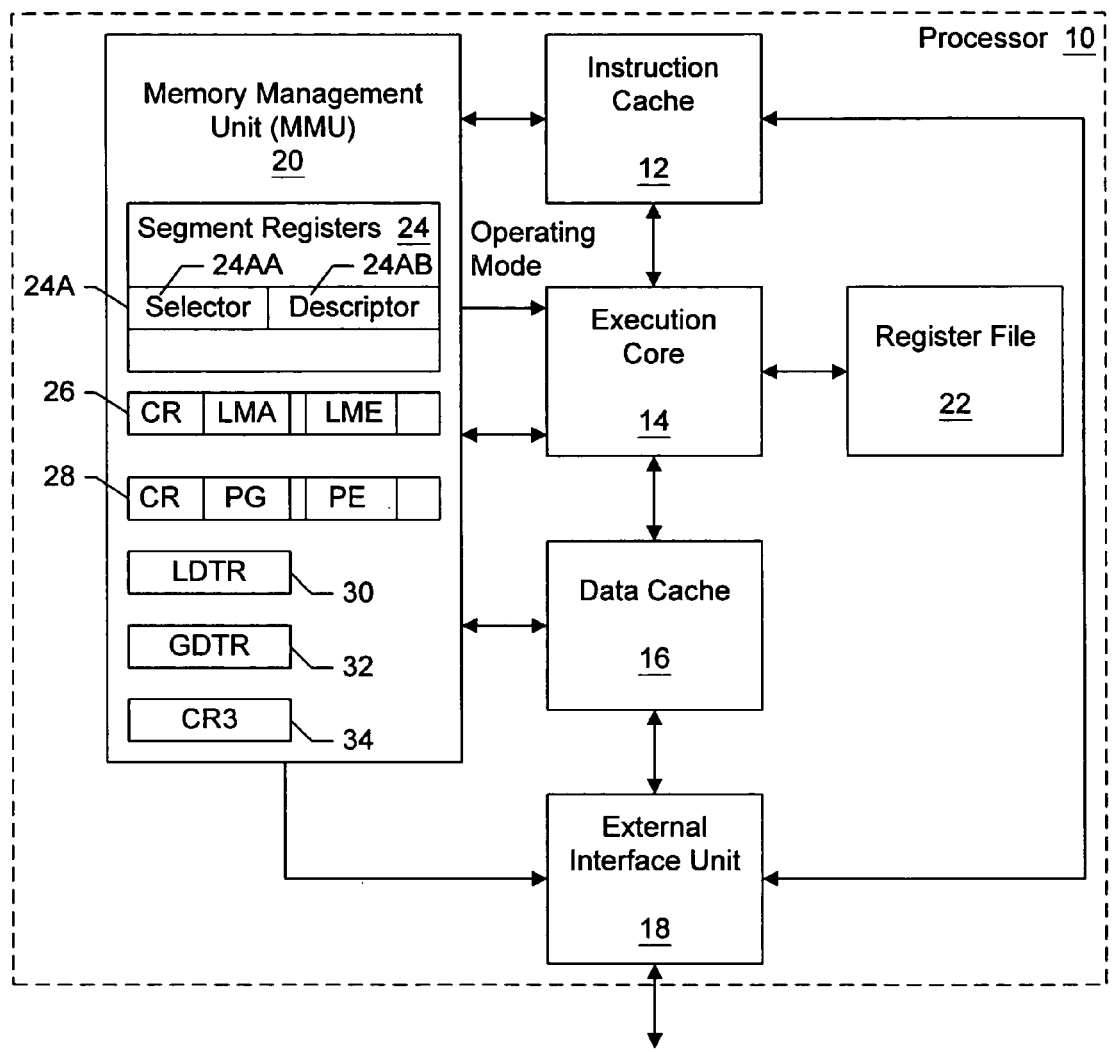
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to FIG. 1, a block diagram illustrating one embodiment of a processor 10 is shown. Other embodiments are possible and contemplated. In the embodiment of FIG. 1, processor 10 includes an instruction cache 12, an execution core 14, a data cache 16, an external interface unit 18, a memory management unit (MMU) 20, and a register file 22. In the illustrated embodiment, MMU 20 includes a set of segment registers 24, a first control register 26, a second control register 28, a local descriptor table register (LDTR) 30, a global descriptor table register (GDTR) 32, and a page table base address register (CR3) 34. Instruction cache 12 is coupled to external interface unit 18, execution core 14, and MMU 20. Execution core 14 is further coupled to MMU 20, register file 22, and data cache 16. Data cache 16 is further coupled to MMU 20 and external interface unit 18. External interface unit 18 is further coupled to MMU 20 and to an external interface.

Processor 10 may employ a processor architecture compatible with the x86 architecture (also known as the IA-32 architecture) and including additional architectural features to support 64 bit processing. More particularly, the processor architecture employed by processor 10 may define a mode, referred to below as "long mode". Long mode is a mode in which 64 bit processing is selectable as an operating mode, as well as 32 bit or 16 bit processing as specified in the x86 architecture. More particularly, long mode may provide for an operating mode in which virtual addresses may be greater than 32 bits in size. In the 32 bit and 16 bit modes, the maximum size of the virtual address may be 32 bits. In order to support the larger virtual addresses, the page table structure may be defined differently when long mode is active than when long mode is inactive (since there are more address bits to be translated). Therefore, as part of the processing of switching to and from long mode, an instruction which updates the page table base address register 34 (e.g. the CR3 register in the x86 architecture) may be executed. The page table base address register 34 stores an address locating the page tables in memory. If switching to long mode, the instruction may update the page table base address register 34 to locate a long mode page table. If switching from long mode, the instruction may update the page table base address register 34 to locate a non-long mode page tables (non-long mode page tables are referred to herein as legacy page tables).

During the time period between the instructions changing the LME indication and changing the page table base register, no translations may be performed, regardless of which of the two registers is changed first. For example, activating long mode may including changing the LME indication to indicate that long mode is desired and changing the page table base address register to indicate the long mode page tables. If the page table base address is changed before the LME indication and a translation is attempted between the changing of the page table base address and the changing of the LME indication, the long mode page tables would be used for the translation before long mode is activated (i.e. while the processor is performing a non-long mode translation). If the LME indication is changed before the page table base address is changed and a translation is attempted between the changing of the LME indication and the changing of the page table base address, the processor would be performing a long mode translation using legacy page tables. In either case, the translation may not be performed properly.

While some embodiments of processor 10 could employ translation lookaside buffers (TLBs) to mitigate the occurrence of translations (in which processor 10 traverses the page tables) during the transition to and from long mode, a TLB miss during the transition may not be completely ruled out. Accordingly, processor 10 may implement a mechanism allowing for orderly transition to and from long mode, even though multiple registers may be changed to perform the transition. Particularly, processor 10 may employ a long mode active (LMA) indication in a control register (e.g. control register 26 in the present embodiment, although the LMA indication may be stored in any control register, including control registers not storing the LME indication). The processor 10 may use the LMA indication as the indication of whether or not long mode is active (i.e. whether or not the processor is operating in long mode). However, the LMA indication may not be modified directly via an instruction. Instead, an instruction is used to change the state of the LME indication to indicate whether or not long mode is desired. Long mode may be activated (as indicated by the LMA indication) via the combination of enabling paging (as indicated by the PG indication in control register 28 and described in more detail below) and the LME indication indicating that long mode is desired. Viewed in another way, the LME indication may be used to enable the transition to long mode. The LMA indication may indicate whether or not the transition has successfully occurred, and thus indicates whether processor 10 is operating according to the long mode definition or processor 10 is operating according to the legacy definition of the x86 processor architecture.

To activate long mode, paging may be disabled, then the LME indication may be set to indicate that long mode is desired, the page table base address register 34 may be updated to locate the long mode page tables, and paging may be enabled. To deactivate long mode, paging may be disabled, the LME indication may be set to indicate that long mode is not desired, the page table base address register 34 may be updated to locate the legacy page tables, and paging may be enabled again. In this manner, translations may be performed using the correct page tables at any given point. Additionally, a mode in which long mode is active and paging is not enabled may be avoided (reducing the overall number of modes and thus simplifying processor 10).

Processor 10 is configured to establish an operating mode in response to information stored in a code segment descriptor corresponding to the currently executing code and further in response to one or more enable indications stored in one or more control registers. As used herein, an "operating mode" specifies default values for various programmably selectable processor attributes. For example, the operating mode may specify a default operand size and a default address size. The default operand size specifies the number of bits in an operand of an instruction, unless an instruction's encoding overrides the default. The default address size specifies the number of bits in an address of a memory operand of an instruction, unless an instruction's encoding overrides the default. The default address size specifies the size of at least the virtual address of memory operands. As used herein, a "virtual address" is an address generated prior to translation through an address translation mechanism (e.g. a paging mechanism) to a "physical address", which is the address actually used to access a memory. Additionally, as used herein, a "segment descriptor" is a data structure created by software and used by the processor to define access control and status for a segment of memory. A "segment descriptor table" is a table in memory having multiple entries, each entry capable of storing a segment descriptor.

In the illustrated embodiment, MMU 20 generates an operating mode and conveys the operating mode to execution core 14. Execution core 14 executes instructions using the operating mode. More particularly, execution core 14 fetches operands having the default operand size from register file 22 or memory (through data cache 16, if the memory operands are cacheable and hit therein, or through external interface unit 18 if the memory operands are noncacheable or miss data cache 16) unless a particular instruction's encoding overrides the default operand size, in which case the overriding operand size is used. Similarly, execution core 14 generates addresses of memory operands, wherein the addresses have the default address size unless a particular instruction's encoding overrides the default address size, in which case the overriding address size is used. In other embodiments, the information used to generate the operating mode may be shadowed locally in the portions of processor 10 which use the operating mode (e.g.

execution core 14), and the operating mode may be determined from the local shadow copies.

As mentioned above, MMU 20 generates the operating mode responsive to a code segment descriptor corresponding to the code being executed and further responsive to one or more values in control registers. Information from the code segment descriptor is stored in one of the segment registers 24 (a register referred to as CS, or code segment). Additionally, control register 26 stores an enable indication (LME) which is used to enable transition to long mode and the LMA indication indicating whether or not long mode is active. In long mode, an operating mode in which the default address size is greater than 32 bits ("32/64 mode") as well as certain compatibility modes for the 32 bit and 16 bit operating modes may be available using the segment descriptor indications. The default operand size may be 32 bits in 32/64 mode, but instructions may override the default 32 bit operand size with a 64 bit operand size when desired. If the LME indication is in an enabled state, then long mode may be activated. If the LME indication is in a disabled state, then long mode may not be activated. In one embodiment, the default address size in 32/64 mode may be implementation-dependent but may be any value up to and including 64 bits. Furthermore, the size of the virtual address may differ in a given implementation from the size of the physical address in that implementation.

It is noted that various indications are described herein (e.g. LMA, LME, etc.). Generally, an indication is a value which may be placed into two or more states. Each state may be assigned a meaning. Some of the indications described herein (including some enable indications) may be described as bits. The bit being set may be one state (e.g. the enabled state for enable indications) and the bit being clear may be the other state (e.g. the disabled state for enable indications). However, other encodings are possible, including encodings in which multiple bits are used and encodings in which the enabled state is the clear state and the disabled state is the set state. Accordingly, the remainder of this description may refer to the LME indication in control register 26 as the LME bit, with the enabled state being set and the disabled state being clear. However, other encodings of the LME indication are contemplated, as set forth above. Similarly, the LMA indication may be referred to as the LMA bit, with the set state indicating that long mode is active and the clear state indicating that long mode is inactive. However, other encodings of the LMA indication are contemplated, as set forth above.

Segment registers 24 store information from the segment descriptors currently being used by the code being executed by processor 10. As mentioned above, CS is one of segment registers 24 and specifies the code segment of memory. The code segment stores the code being executed. Other segment registers may define various data segments (e.g. a stack data segment defined by the SS segment register, and up to four data segments defined by the DS, ES, FS, and GS segment registers). FIG. 1 illustrates the contents of an exemplary segment register 24A, including a selector field 24AA and a descriptor field 24AB. Selector field 24AA is loaded with a segment selector to activate a particular segment in response to certain segment load instructions executed by execution core 14. The segment selector identifies the segment descriptor in a segment descriptor table in memory. More particularly, processor 10 may employ two segment descriptor tables: a local descriptor table and a global descriptor table. The base address of the local descriptor table is stored in the LDTR 30. Similarly, the base address of the global descriptor table is stored in GDTR 32. A bit within the segment selector (the table indicator bit) selects the descriptor table, and an index within the segment selector is used as an index into the selected table. When an instruction loads a segment selector into one of segment registers 24, MMU 20 reads the corresponding segment descriptor from the selected segment descriptor table and stores information from the segment descriptor into the segment descriptor field (e.g. segment descriptor field 24AB for segment register 24A). The information stored in the segment descriptor field may comprise any suitable subset of the segment descriptor, including all of the segment descriptor, if desired. Additionally, other information derived from the segment descriptor or other sources may be stored in the segment descriptor field, if desired. For example, an embodiment may decode the operating mode indications from the code segment descriptor and store the decoded value rather than the original values of the operating mode indications. If an instruction causes CS to be loaded with a segment selector, the code segment may change and thus the operating mode of processor 10 may change. Segment descriptor tables are described in more detail below.

In one embodiment, only the CS segment register is used in 32/64 mode. The data segment registers are ignored. In 16 and 32 bit modes, the code segment and data segments may be active. Furthermore, a second enable indication (PE) in control register 28 may affect the operation of MMU 20. The PE enable indication may be used to enable protected mode, in which segmentation and/or paging address translation mechanisms may be used. If the PE enable indication is in the disabled state, segmentation and paging mechanisms are disabled and processor 10 is in "real mode" (in which addresses generated by execution core 14 are physical addresses). Similar to the LME indication, the PE indication may be a bit in which the enabled state is the bit being set and the disabled state is the bit being clear. However, other embodiments are contemplated as described above.

Control register 28 is further illustrated in FIG. 1 as storing a paging enable indication (PG). The PG indication may indicate whether or not paging is enabled. As mentioned above, the LMA bit is set once paging is enabled and the LME bit is set. As used herein, the term "paging" or "paging address translation" refers to the translation of virtual addresses to physical addresses using mappings stored in a page table structure indicated by the page table base address register 34. A given page mapping maps any virtual address having the same virtual page number to a corresponding physical address in a page of physical memory. The page table is a predefined table of entries stored in memory. Each of the entries store information used to map virtual addresses to physical addresses.

It is noted that MMU 20 may employ additional hardware mechanisms, as desired. For example, MMU 20 may include paging hardware to implement paging address translation from virtual addresses to physical addresses. The paging hardware may include a translation lookaside buffer (TLB) to store page translations.

It is noted that control registers 26 and 28 may be implemented as architected control registers (e.g. control register 26 may be CR4 and control register 28 may be CR0). Alternatively, one or both of the control registers may be implemented as model specific registers to allow for other uses of the architected control registers without interfering with 32/64 mode. Generally, the control registers are each addressable by one or more instructions defined in the processor architecture, so that the registers may be changed as desired.

Generally, instruction cache 12 is a high speed cache memory for storing instruction bytes. Execution core 14 fetches instructions from instruction cache 12 for execution. Instruction cache 12 may employ any suitable cache organization, including direct-mapped, set associative, and fully associative configurations. If an instruction fetch misses in instruction cache 12, instruction cache 12 may communicate with external interface unit 18 to fill the missing cache line into instruction cache 12. Additionally, instruction cache 12 may communicate with MMU 20 to receive physical address translations for virtual addresses fetched from instruction cache 12.

Execution core 14 executes the instructions fetched from instruction cache 12. Execution core 14 fetches register operands from register file 22 and updates destination registers in register file 22. The size of the register operands is controlled by the operating mode and any overrides of the operating mode for a particular instruction. Similarly, execution core 14 fetches memory operands from data cache 16 and updates destination memory locations in data cache 16, subject to the cacheability of the memory operands and hitting in data cache 16. The size of the memory operands is similarly controlled by the operating mode and any overrides of the operating mode for a particular instruction. Furthermore, the size of the addresses of the memory operands generated by execution core 14 is controlled by the operating mode and any overrides of the operating mode for a particular instruction.

Execution core 14 may employ any suitable construction. For example, execution core 14 may be a superpipelined core, a superscalar core, or a combination thereof. Execution core 14 may employ out of order speculative execution or in order execution, according to design choice. Additionally, embodiments of execution core 14 may employ any of the above constructions and may include microcoding, as desired.

Register file 22 may include 64 bit registers which may be accessed as 64 bit, 32 bit, 16 bit, or 8 bit registers as indicated by the operating mode of processor 10 and any overrides for a particular instruction. The register format for one embodiment is described below with respect to FIG. 7. The registers included in register file 22 may include the RAX, RBX, RCX, RDX, RDI, RSI, RSP, and RBP registers (which may be 64 bit versions of the EAX, EBX, ECX, EDX, EDI, ESI, ESP, and EBP registers defined in the x86 processor architecture, respectively). Additionally, in one embodiment, register file 22 may include additional registers addressed using a register extension (REX) prefix byte, described in more detail below. Register file 22 may further include the RIP register, which may be a 64 bit version of the EIP register. Alternatively, execution core 14 may employ a form of register renaming in which any register within register file 22 may be mapped to an architected register. The number of registers in register file 22 may be implementation dependent for such an embodiment.

Data cache 16 is a high speed cache memory configured to store data. Data cache 16 may employ any suitable cache organization, including direct-mapped, set associative, and fully associative configurations. If a data fetch or update misses in data cache 16, data cache 16 may communicate with external interface unit 18 to fill the missing cache line into data cache 16. Additionally, if data cache 16 employs a writeback caching policy, updated cache lines which are being cast out of data cache 16 may be communicated to external interface unit 18 to be written back to memory. Data cache 16 may communicate with MMU 20 to receive physical address translations for virtual addresses presented to data cache 16.

External interface unit 18 communicates with portions of the system external to processor 10. External interface unit 18 may communicate cache lines for instruction cache 12 and data cache 16 as described above, and may communicate with MMU 20 as well. For example, external interface unit 18 may access the segment descriptor tables and/or paging tables on behalf of MMU 20.

It is noted that processor 10 may include an integrated level 2 (L2) cache, if desired. Furthermore, external interface unit 18 may be configured to communicate with a backside cache in addition to communicating with the system.

It is noted that the term "mode" refers to a state of the processor which governs one or more aspects of the processor operation. The governed aspects of the processor operate different based on the selected mode. A "mode indication" is a value or values which indicate the current mode. As mentioned above with respect to indications in general, a mode indication may be a single bit or a multibit value, as desired. The LMA bit may be an example of a mode indication. Additionally, a mode is "active" if the processor is operating according to the mode. A mode is "inactive" if the processor is not operating according to the mode (e.g. the processor may be operating according to some other mode).

While the processor architecture described herein may be compatible with the x86 processor architecture for 16 and 32 bit modes, in one embodiment, other embodiments may employ any 16 and 32 bit modes. The other embodiments may or may not be compatible with the x86 processor architecture or any other processor architecture. It is further noted that, while a specific set of information is described herein as being used to generate the operating mode, any combination of indications and/or information from memory data structures such as segment descriptor tables and page tables may be used to generate the operating mode in various embodiments.

Turning now to FIG. 2, a block diagram of one embodiment of a code segment descriptor 40 for 32/64 mode is shown. Other embodiments are possible and contemplated. In the embodiment of FIG. 2, code segment descriptor 40 comprises 8 bytes with the most significant 4 bytes illustrated above the least significant 4 bytes. The most significant four bytes are stored at a numerically larger address than the least significant four bytes. The most significant bit of each group of four bytes is illustrated as bit 31 in FIG. 2 (and FIG. 3 below), and the least significant bit is illustrated as bit 0. Short vertical lines within the four bytes delimit each bit, and the long vertical lines delimit a bit but also delimit a field (both in FIG. 2 and in FIG. 3).

Unlike the 32 bit and 16 bit code segment descriptors illustrated in FIG. 3 below, code segment descriptor 40 does not include a base address or limit. Processor 10 employs a flat virtual address space for 32/64 mode (rather than the segmented linear address space employed in 32 bit and 16 bit modes). Accordingly, the portions of code segment descriptor 40 which would otherwise store the base address and limit are reserved in segment descriptor 40. It is noted that a virtual address provided through segmentation may also be referred to herein as a "linear address". The term "virtual address" encompasses any address which is translated through a translation mechanism to a physical address actually used to address memory, including linear addresses and other virtual addresses generated in non-segmented architectures.

Segment descriptor 40 includes a D bit 42, an L bit 44 (set to one for a 32/64 mode code segment), an available bit (AVL) 46, a present (P) bit 48, a descriptor privilege level (DPL) 50, and a type field 52. D bit 42 and L bit 44 are used to determine the operating mode of processor 10, as illustrated in FIG. 5 below. AVL bit 46 is available for use by system software (e.g. the operating system). P bit 48 is used to indicate whether or not the segment is present in memory. If P bit 48 is set, the segment is present and code may be fetched from the segment. If P bit 48 is clear, the segment is not present and an exception is generated to load the segment into memory (e.g. from disk storage or through a network connection). The DPL indicates the privilege level of the segment. Processor 10 employs four privilege levels (encoded as 0 through 3 in the DPL field, with level 0 being the most privileged level). Certain instructions and processor resources (e.g. configuration and control registers) are only executable or accessible at the more privileged levels, and attempts to execute these instructions or access these resources at the lower privilege levels result in an exception. When information from code segment 40 is loaded into the CS segment register, the DPL becomes the current privilege level (CPL) of processor 10. Type field 52 encodes the type of segment. For code segments, the most significant bit two bits of type field 52 may be set (the most significant bit distinguishing a code or data segment from a system segment, and the second most significant bit distinguishing a code segment from a data segment), and the remaining bits may encode additional segment type information (e.g. execute only, execute and read, or execute and read only, conforming, and whether or not the code segment has been accessed).

It is noted that, while several indications in the code segment descriptor are described as bits, with set and clear values having defined meanings, other embodiments may employ the opposite encodings and may use multiple bits, as desired. Thus, for example, the D bit 42 and the L bit 44 may each be an example of an operating mode indication which may be one or more bits as desired, similar to the discussion of enable indications above.

Turning now to FIG. 3, a block diagram of one embodiment of a code segment descriptor 54 for 32 and 16 bit compatibility mode is shown. Other embodiments are possible and contemplated. As with the embodiment of FIG. 2, code segment descriptor 54 comprises 8 bytes with the most significant 4 bytes illustrated above the least significant 4 bytes.

Code segment descriptor 54 includes D bit 42, L bit 44, AVL bit 46, P bit 48, DPL 50, and type field 52 similar to the above description of code segment descriptor 40. Additionally, code segment descriptor 54 includes a base address field (reference numerals 56A, 56B, and 56C), a limit field (reference numerals 57A and 57B) and a G bit 58. The base address field stores a base address which is added to the logical fetch address (stored in the RIP register) to form the linear address of an instruction, which may then optionally be translated to a physical address through a paging translation mechanism. The limit field stores a segment limit which defines the size of the segment. Attempts to access a byte at a logical address greater than the segment limit are disallowed and cause an exception. G bit 58 determines the scaling of the segment limit field. If G bit 58 is set the limit is scaled to 4 K byte pages (e.g. 12 least significant zeros are appended to the limit in the limit field). If G bit 58 is clear, the limit is used as is.

It is noted that code segment descriptors for 32 and 16 bit modes when long mode is not active may be similar to code segment descriptor 54, except the L bit is reserved and defined to be zero. It is further noted that, in 32 and 16 bit modes (both compatibility mode with the LMA bit set and modes with the LMA bit clear) according to one embodiment, data segments are used as well. Data segment descriptors may be similar to code segment descriptor 54, except that the D bit 42 is defined to indicate the upper bound of the segment or to define the default stack size (for stack segments).

Figure 4:
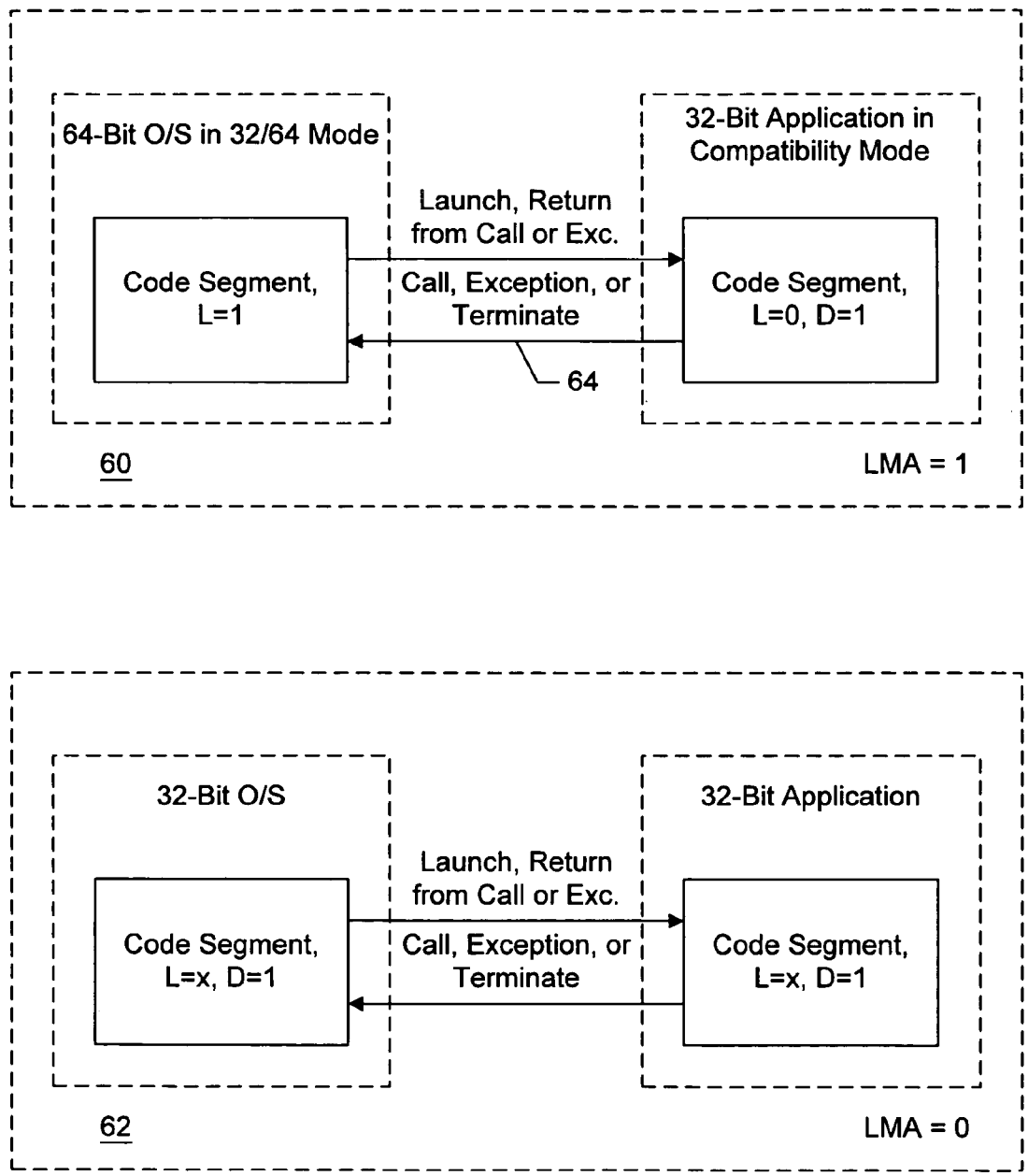
FIG. 4 is a block diagram of operation in compatibility mode and in legacy mode according to one embodiment of the processor shown in FIG. 1.

Turning next to FIG. 4, a diagram illustrating exemplary uses of the LMA bit and the compatibility modes to allow for a high degree of flexibility in implementing the 32/64 mode and the 32 and 16 bit modes is shown. A box 60 illustrates exemplary operation when the LMA bit is set (long mode is active), and a box 62 illustrates exemplary operation when the LMA bit is clear (long mode is not active).

As illustrated in box 60, the compatibility modes supported when long mode is active may allow for a 64 bit operating system (i.e. an operating system designed to take advantage of the virtual and physical address spaces in excess of 32 bits and/or data operands of 64 bits) to operate with a 32 bit application program (i.e. an application program written using 32 bit operand and address sizes). The code segment for the operating system may be defined by the 32/64 mode code segment descriptor 40 illustrated in FIG. 2, and thus the L bit may be set. Accordingly, the operating system may take advantage of the expanded virtual address space and physical address space for the operating system code and the data structures maintained by the operating system (including, e.g. the segment descriptor tables and the paging translation tables). The operating system may also use the 64 bit data type defined in 32/64 mode using instruction encodings which override the default 32 bit operand size. Furthermore, the operating system may launch a 32 bit application program by establishing one or more 32 bit compatibility mode segment descriptors (L bit cleared, D bit set, e.g. segment descriptor 54 shown in FIG. 2) in the segment descriptor table and branching into one of the compatibility mode segments. Similarly, the operating system may launch a 16 bit application program by establishing one or more 16 bit compatibility mode segment descriptors (L bit cleared, D bit cleared, e.g. segment descriptor 54 shown in FIG. 2) in the segment descriptor table and branching into one of the compatibility mode segments. Accordingly, a 64 bit operating system may retain the ability to execute existing 32 bit and 16 bit application programs in the compatibility mode. A particular application program may be ported to 32/64 mode if the expanded capabilities are desired for that program, or may remain 32 bit or 16 bit.

While processor 10 is executing the 32 bit application program, the operating mode of processor 10 is 32 bit. Thus, the application program may generally execute in the same fashion as it does in 32 bit mode with the LMA bit clear (e.g. when the operating system is a 32 bit operating system as well). However, the application program may call an operating system service, experience an exception, or terminate. In each of these cases, processor 10 may return to executing operating system code (as illustrated by arrow 64 in FIG. 4). Since the operating system code operates in 32/64 mode, the address of the operating system service routine, exception handler, etc. may exceed 32 bits. Thus, processor 10 may need to generate an address greater than 32 bits prior to returning to the operating system code. The LMA bit provides processor 10 with an indication that the operating system may be operating in 32/64 mode even though the current operating mode is 32 bit, and thus processor 10 may provide the larger address space for operating system calls and exceptions.

In one embodiment, exceptions are handled using interrupt segment descriptors stored in an interrupt segment descriptor table. If the LMA bit is set, the interrupt segment descriptors may be 16 byte entries which include a 64 bit address of the operating system routine which handles the exception. If the LMA bit is clear, the interrupt segment descriptors may be eight byte entries which include a 32 bit address. Accordingly, processor 10 accesses the interrupt descriptor table responsive to the LMA indication (i.e. reading a 16 byte entry if the LMA bit is set and reading an eight byte entry if the LMA bit is clear). Therefore, exceptions may be handled by the 64 bit operating system even though the application program is executing in 32 bit compatibility mode. Furthermore, processor 10 supports a 32 bit (or 16 bit) operating system if the LMA bit is clear.

Similarly, the call mechanisms within processor 10 may operate in different fashions based on the state of the LMA bit. Since the operating system typically executes at a higher privilege level than the application program, transfers from the application program to the operating system are carefully controlled to ensure that the application program is only able to execute permitted operating system routines. More generally, changes in privilege level are carefully controlled. In one embodiment, processor 10 may support at least two mechanisms for performing operating system calls. One method may be through a call gate in the segment descriptor tables (described in more detail below). Another method may be the SYSCALL instruction supported by processor 10, which uses a model specific register as the source of the address of the operating system routine. Updating the model specific registers is a privileged operation, and thus only code executing at a higher privilege level (e.g. operating system code) may establish the address in the model specific register used by the SYSCALL instruction. For the SYSCALL method, a second model specific register may be defined to store the most significant 32 bits of the address of the operating system routine. Thus, if the LMA bit is set, the address may be read from the two model specific registers. If the LMA bit is clear, the address may be read from the model specific register storing the least significant 32 bits. Alternatively, the model specific register used by the SYSCALL instruction may be expanded to 64 bits and the address may be 32 bits (the least significant 32 bits of the model specific register) or 64 bits based on the state of the LMA bit.

As illustrated above, having the LMA bit set may allow for processor 10 to operate in a system in which the operating system is 64 bit and one or more application programs are not 64 bit (e.g. 32 bit as shown or 16 bit, which operates in a similar fashion to the above description). Generally, even though the processor may be operating in 32 or 16 bit mode, the LMA bit informs the processor that the operating system data structures are as defined for the 64 bit mode, and the processor may access the structures appropriately. Additionally, as illustrated by box 62, having the LMA bit clear may allow for processor 10 to operate in 32 bit or 16 bit modes compatible with the x86 architecture. As described above, the mechanisms for handling exceptions and operating system calls are designed to handle the LMA bit being set or clear, and thus the 32 bit and 16 bit modes may operate unmodified, even though processor 10 is capable of operating in 32/64 mode. Furthermore, by providing the x86 compatible 16 and 32 bit modes when the LMA bit is clear, (and ignoring the L bit, which is reserved in these modes) processor 10 may operate in a system in which the L bit is defined for some other purpose than for 32/64 mode and may still support 32/64 mode if the LMA bit is set. Accordingly, a system employing a 32 bit operating system and 32 bit or 16 bit application programs may employ processor 10. Subsequently, the system could be upgraded to a 64 bit operating system without having to change processor 10.

Not illustrated in FIG. 4 is a 64 bit operating system and a 64 bit application program operating with the LMA bit set. The mechanisms for calling operating system routines described above for the 64 bit operating system and 32 bit application program may apply equally to the 64 bit application program as well. Additionally, call gates which support 64 bits of offset are supported (as will be described in more detail below).

Turning next to FIG. 5, a table 70 is shown illustrating the states of the LMA bit, the L bit in the code segment descriptor, and the D bit in the code segment descriptor and the corresponding operating mode of processor 10 according to one embodiment of processor 10. Other embodiments are possible and contemplated. As table 70 illustrates, if the LMA bit is clear, then the L bit is reserved (and defined to be zero). However, processor 10 may treat the L bit as a don't care if the LMA bit is clear. Thus, the x86 compatible 16 bit and 32 bit modes may be provided by processor 10 if the LMA bit is clear. If the LMA bit is set and the L bit in the code segment is clear, then a compatibility operating mode is established by processor 10 and the D bit selects 16 bit or 32 bit mode. If the LMA bit and the L bit are set and the D bit is clear, 32/64 mode is selected for processor 10. Finally, the mode which would be selected if the LMA, L and D bits are all set is reserved.

As mentioned above and illustrated in FIG. 6 below, the 32/64 operating mode includes a default address size in excess of 32 bits (implementation dependent but up to 64 bits) and a default operand size of 32 bits. The default operand size of 32 bits may be overridden to 64 bits via a particular instruction's encoding. The default operand size of 32 bits is selected to minimize average instruction length (since overriding to 64 bits involves including an instruction prefix in the instruction encoding which may increase the instruction length) for programs in which 32 bits are sufficient for many of the data manipulations performed by the program. For such programs (which may be a substantial number of the programs currently in existence), moving to a 64 bit operand size may actually reduce the execution performance achieved by the program (i.e. increased execution time). In part, this reduction may be attributable to the doubling in size in memory of the data structures used by the program when 64 bit values are stored. If 32 bits is sufficient, these data structures would store 32 bit values, Thus, the number of bytes accessed when the data structure is accessed increases if 64 bit values are used where 32 bit values would be sufficient, and the increased memory bandwidth (and increased cache space occupied by each value) may cause increased execution time. Accordingly, 32 bits is selected as the default operand size and the default may be overridden via the encoding of a particular instruction.

Turning next to FIG. 6, a table 72 is shown illustrating one embodiment of the use of instruction prefixes to override the operating mode for a particular instruction. Other embodiments are possible and contemplated. Execution core 14 determines the address size and operand size for a particular instruction according to table 72. In particular for the embodiment illustrated in FIG. 6, an instruction prefix byte (the address size override prefix byte) may be used to override the default address size and another instruction prefix byte (the operand size override prefix byte) may be used to override the default operand size. Additionally, a REX prefix byte may be used to override the default operand size as well. The address size override prefix byte is encoded as 67 (in hexadecimal) and the operand size override prefix byte is encoded as 66 (in hexadecimal). The override prefix used in a particular instruction forms the columns of the table. The rows of the table indicate the operand size and address size of the particular instruction, based on the operating mode and the override prefix in the corresponding column.

The column labeled "None" illustrates the default operand size and address size for each operating mode. It is noted that the 32 bit and 16 bit mode rows refer to both the compatibility modes (LMA set) and the standard modes (LMA clear). Furthermore, while the default address size is 64 bits in 32/64 mode, the actual number of address bits may be implementation dependent, as discussed above.

The inclusion of the address size override prefix in 32/64 bit mode changes the address size from 64 bit (which may be less than 64 bits for a given implementation but is greater than 32 bits) to 32 bit, as shown in table 72. Additionally, the inclusion of the operand size override prefix in 32/64 bit mode changes the operand size from 32 bit to 16 bit. It may be desirable to provide for a 16 bit operand (e.g. to support the short integer data type in the "C" programming language). The inclusion of the REX prefix may be used to override the operand size to 64 bits in 32/64 mode. In one embodiment, the REX prefix is a byte in which the most significant four bits are "4" and the most significant bit of the least significant four bits is set. In the illustrated embodiment, the REX prefix byte does not apply ("DNA" in FIG. 6) except for operand size override in 32/64 mode.

For the 32 bit modes, the inclusion of an override prefix toggles the default 32 bit size to 16 bit. Similarly, for 16 bit modes, the inclusion of an override prefix toggles the default 16 bit size to 32 bit.

Turning now to FIG. 7, a diagram illustrating one embodiment of the RAX register 74 is shown. Other registers within register file 22 may be similar. Other embodiments are possible and contemplated. In the embodiment of FIG. 7, register 74 includes 64 bits, with the most significant bit labeled as bit 63 and the least significant bit labeled as bit 0. FIG. 7 illustrates the portions of the RAX register accessed based upon the operand size of an instruction (if the A register is selected as an operand). More particularly, the entirety of register 74 is accessed if the operand size is 64 bits (as illustrated by the brace labeled "RAX" in FIG. 7). If the operand size is 32 bits, bits 31:0 of register 74 are accessed (as illustrated by the brace labeled "EAX" in FIG. 7). If the operand size is 16 bits, bits 16:0 of the register are accessed (as illustrated by the brace labeled "AX" in FIG. 7). The above operand sizes may be selected based on the operating mode and the inclusion of any override prefixes. However, certain instruction opcodes are defined which access an eight bit register (AH or AL in FIG. 7).

Figure 8:
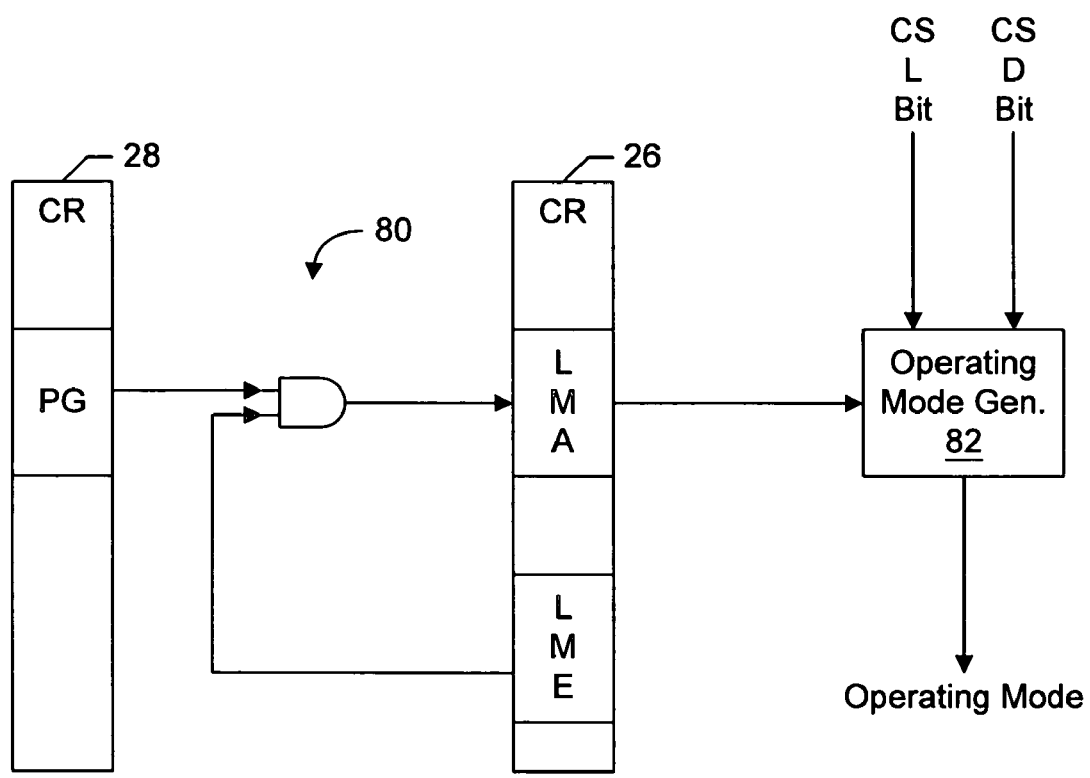
FIG. 8 is a block diagram illustrating one embodiment of generation of a mode indicator.

Turning next to FIG. 8, a block diagram is shown illustrating one embodiment of control registers 26 and 28, a circuit 80, and an operating mode generation circuit 82. Other embodiments are possible and contemplated. Control registers 26 and 28 are coupled to circuit 80, and control register 26 is further coupled to operating mode generation circuit 82. Operating mode generating circuit 82 is further coupled to receive the L bit and D bit from the segment descriptor corresponding to the code segment register (CS) and to provide an operating mode.

Circuit 80 is configured to generate the LMA bit from the LME and PG bits. Thus, circuit 80 is coupled to receive the LME and PG bits, and is coupled to provide the LMA bit. In the illustrated embodiment, circuit 80 is represented by an AND gate, since the LMA bit is defined to be set if the PG bit is set and the LME bit is set and the LMA bit is defined to be cleared otherwise. Other embodiments may use different circuitry for circuit 80, depending on the definition of the LME, PG, and LMA indications. Furthermore, embodiments are contemplated in which the circuit 80 comprises microcoding to change the LMA bit based on changes to the LME and PG bits, and embodiments are contemplated in which the functionality of circuit 80 is realized in software (e.g. the software embodiments described below). Generally circuit 80 may generate the LMA indication to indicate that long mode is active if the paging indication indicates paging is active and the LME indication indicates that long mode is desired, and may generate the LMA indication to indicate that long mode is inactive otherwise.

Operating mode generation circuit 82 is configured to generate an operating mode (e.g. for execution core 14 shown in FIG. 1) responsive to the LMA bit and the L bit and D bit from the code segment descriptor. More particularly, operating mode generation circuit 82 may be configured to generate the operating mode according to the table shown in FIG. 5. Accordingly, long mode is not active in the embodiment of FIG. 8 unless paging is enabled and the LME bit is set and the operating modes available when long mode is active (LMA bit set in FIG. 5) are not available unless long mode is active.

As mentioned above, while the LMA bit is shown in FIG. 8 as being stored in the same register as the LME bit, other embodiments may store the LMA bit in any register, as desired.

In addition to generating the operating mode as shown in FIGS. 5 and 8, processor 10 may implement certain checks for invalid combinations of indications when changing one of the indications in response to executing an instruction addressing the register storing that indication. If the combination (including the changed indication) is invalid, processor 10 may signal an exception instead of changing the indication. In this manner, processor 10 may prevent entering an undefined state (i.e. a combination for which the behavior of the processor is not specified in the processor architecture). In other words, processor 10 insures that, when an indication is changed, the state the processor enters is consistent with the defined states in the processor architecture. Thus, these checks may be termed "consistency checks". FIG. 9 is a table 90 illustrating exemplary consistency checks for one embodiment of processor 10. Other embodiments are possible and contemplated.

Particularly, if the LME bit is being changed from 0 to 1 (disabled to enabled), then an exception is signalled if paging is enabled (PG bit is 1). Similarly, if the LME bit is being changed from 1 to 0, an exception is signalled if paging is enabled. In this manner, processor 10 enforces the requirement that the LME bit be changed only when paging is disabled. Otherwise, the definition of the page tables to be used for translation would change (since the LMA bit would change state in response to the LME change) without changing the page table base address register to point to the appropriate set of page tables.

If the PG bit is being changed from 0 to 1, an exception is signalled if the LME bit is 1 and the physical address extension (PAE) bit is zero. The PAE bit is defined in the x86 architecture (as a bit in control register CR4) and is indicative, when set, that physical address extensions are enabled. The physical address extension in the x86 architecture extends the physical addresses from 32 bits to 36 bits, and thus page table entries are larger to accommodate the additional physical address bits. The physical address extension is required to be enabled for long mode to be active, since physical addresses in long mode may exceed 32 bits as well. Similarly, if the PAE bit is changed from 1 to 0 and the LMA bit is set (indicating long mode is active), an exception is signalled.

FIGS. 10 and 11 illustrate a set of operations which may be used to enter long mode and leave long mode, respectively. Each operation may be performed executing by one or more instructions defined by the processor architecture implemented by processor 10. Particularly, the one or more instructions may include an instruction addressing the register which stores the corresponding indication (or page table base address). An instruction addresses a register if the instruction specifies the register as an operand. Thus, execution of the instruction may result in reading or writing the addressed register.

Turning next to FIG. 10, a flowchart is shown illustrating a set of operations to enter long mode. Other embodiments are possible and contemplated.

Control register 28 is written to clear the PG bit (block 100), thus disabling paging. Paging is disabled prior to attempting to enter long mode so that the LME bit may be set and the page table base address register 34 may be programmed to point to the long mode page tables without putting processor 10 into any inconsistent states. It is noted that block 100 is optional. If the code sequence represented by FIG. 10 is executed at a time when it is known that paging is disabled, block 100 may be omitted.

The control register storing the PAE bit is written to set the PAE bit (block 102), enabling physical address extensions. The page table base address register (e.g. CR3, in the x86 architecture) is written to point to the long mode page tables (block 104). The control register 26 is written to set the LME bit (block 106). The operations represented by blocks 102, 104, and 106 may be performed in any order.

Finally, the control register 28 is written to set the PG bit (block 108). Setting the PG bit enables paging, and thus may cause the transition from long mode being inactive (LMA bit clear) to long mode being active (LMA bit set).

Turning now to FIG. 11, a flowchart is shown illustrating a set of operations to leave long mode. Other embodiments are possible and contemplated.

Similar to the operations for entering long mode, leaving long mode includes writing the control register 28 to clear the PG bit (block 110), thus disabling paging. The disabling of paging at block 110 also causes long mode to become inactive (LMA bit clears).

The page table base address register (e.g. CR3, in the x86 architecture) is written to point to the legacy page tables (block 112). The control register 26 is written to clear the LME bit (block 114). The operations represented by blocks 112 and 114 may be performed in any order.

Optionally, if the mode being entered upon leaving long mode includes paging, control register 28 is written to set the PG bit (block 116), thus enabling paging. Since the LME bit was cleared in block 114, enabling paging at block 116 does not activate long mode.

Software Embodiments

While the above description may generally have described a processor which may directly support, in hardware, the processor architecture having the features described above, it is contemplated that other processor embodiments may not directly implement the processor architecture. Instead, such embodiments may directly implement a different processor architecture (referred to below as a native processor architecture, which may define a native instruction set including native instructions). Any native processor architecture may be used. For example, the MIPS, Power PC, Alpha, Sparc, ARM, etc. architectures may be used. The processor architecture may be implemented in software executing on the native processor architecture in a variety of fashions, using any native processor architecture such as, for example, the Crusoe products of Transmeta Corporation.

Generally, a processor embodiment implementing a native processor architecture different than the processor architecture described above (referred to below as the non-native processor architecture) may support the non-native processor architecture in a variety of fashions. For example, such a processor embodiment may execute interpreter software which reads each non-native instruction in a non-native code sequence as data, and executes various software routines which emulate the defined operation of the non-native instruction as defined in the non-native processor architecture. Alternatively, translator software may be executed. The translator software may translate the non-native instructions in the code sequence to an equivalent set of native instructions defined by the native instruction set architecture. The native code sequence may be stored in memory, and may be executed instead of the corresponding non-native code sequence. In yet another alternative, a mixture of interpretation and translation may be used. For example, the code sequence may be interpreted, but the interpreter may also generate statistics about which parts of the code sequence are being most frequently executed. The most frequently executed portions may then be translated to native code sequences.

In any of the above methods, the architected state defined by the non-native processor architecture may be maintained by the combination of the processor and the software (interpreter or translator) in a variety of fashions. For example, the non-native architected state may be mapped to memory locations in a memory addressable by the processor, to general registers defined by the native processor architecture (by software convention, either in the interpreter or in the translator), or the processor may directly support the non-native architected state by defining registers or other storage hardware within the processor that corresponds to the non-native architected state. The non-native architected state may be stored using any combination of the above methods, as desired.

Generally, the architected state includes any state defined to exist by the architecture. For example, in the above described embodiment, the non-native architected state may include general registers (e.g. RAX, RBX, etc.), segment registers, control registers, other registers such as the model specific registers (MSRs), etc. Additionally, the architected state may include data structures defined for the operating system to create, such as the descriptor tables, page tables, task state segments, etc.

Figure 12:
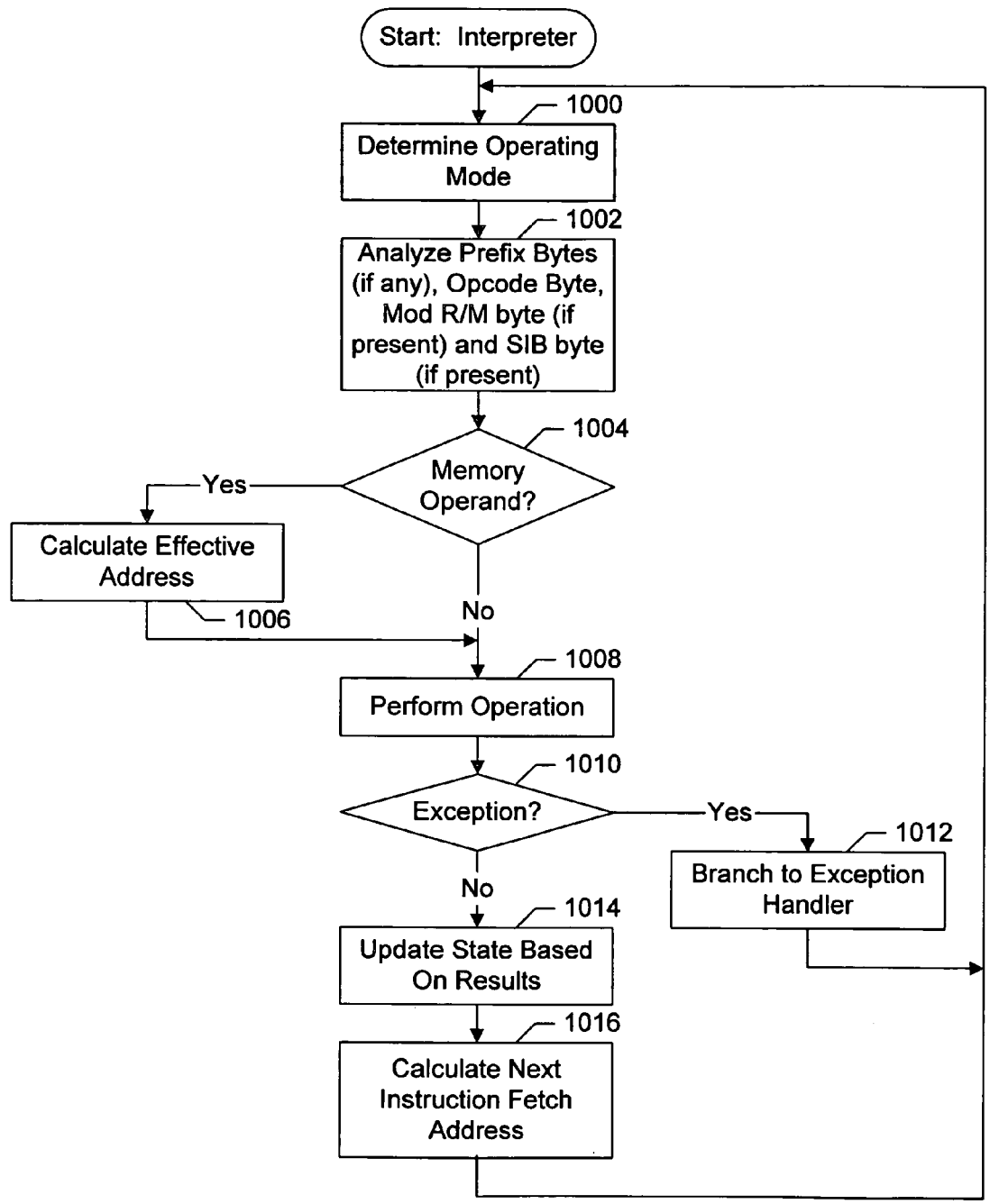
FIG. 12 is a flowchart illustrating one embodiment of an interpreter.

Turning to FIG. 12, a flowchart illustrating an exemplary interpreter which may be used to interpret non-native instructions is shown. Other embodiments are possible and contemplated. While the blocks shown are illustrated in a particular order for ease of understanding, any suitable order may be used. Furthermore, blocks may be performed in parallel, as desired.

The blocks shown in FIG. 12 illustrate the emulation of one non-native instruction. Generally, the interpreter may execute the blocks shown in FIG. 12 for each non-native instruction to be executed according to the non-native code sequence to be executed.

The interpreter may determine the operating mode for the non-native instruction (block 1000). As described above, the operating mode may be determined from the LMA bit in control register 26 and the L bit and D bit from the code segment descriptor indicated by the CS segment register. The operating mode may be determined anew from the LMA, L bit, and D bit for each non-native instruction, or the resulting operating mode may be stored in a temporary register for access by the interpreter for each non-native instruction. If the resulting operating mode is stored, the interpreter may update the stored operating mode if an instruction modifies the CS segment register or interrupt or exception handling causes the operating mode to change. As mentioned above, the CS segment register and the control register(s) (which are part of the non-native architected state) may actually be memory locations, general registers, or special purpose registers, or any combination thereof.

The interpreter may read the current non-native instruction from memory, and may analyze the non-native instruction to determine the operations to be taken to emulate the non-native instruction (block 1002). The interpreter may read the non-native instruction one byte at a time, or may read a suitable set of consecutive bytes and process the bytes. For example, a native processor architecture in which operands are 32 bit may read 32 bits (4 bytes) of the non-native instruction at a time, and then may process the four bytes before reading any additional bytes.

Generally, the interpreter software may decode the non-native instruction in a manner analogous to processor 10 decoding the instruction in hardware. Thus, for the illustrated non-native processor architecture, which is compatible with the x86 processor architecture, the analyzing of the non-native instruction includes analyzing any prefix bytes which may precede the opcode byte, analyzing the opcode byte, analyzing the addressing mode (Mod R/M) byte (if present), and analyzing the scale-index-base (SIB) byte (if present). Prefix bytes may override the operating mode, and may also include register specifier bits (e.g. the REX prefix byte). The opcode byte specifies the operation to be performed, and in some cases may include a register specifier or may implicitly specify an operand (e.g. the stack or the stack pointer). The Mod R/M byte specifies operands (including any displacement or immediate operands which may follow the Mod RIM byte or the SIB byte, if the SIB byte is present) and may include register specifiers. Finally, the SIB byte may include register specifiers. From the information gained from analyzing the non-native instruction, the interpreter has the information to emulate the non-native instruction (including operating mode for the non-native instruction, which specifies the operand size and address size of the non-native instruction, operands, the operation to be performed, etc.).

If the non-native instruction includes a memory operand (decision block 1004), the interpreter may calculate the effective address of the instruction (block 1006). If the non-native instruction has a memory operand, some of the operands identified in block 1002 may be address operands used to generate the effective address. Thus, the interpreter may read the address operands from the non-native architected state and may add them to generate an effective address. The size of the effective address may be determined by the address size for the instruction, as determined at blocks 1000 and 1002. It is noted that the native processor architecture may support an address size which is less than the address size supported by the non-native processor architecture. For example, in one exemplary embodiment described above, the virtual address size may be 48 bits in 32/64 mode. The native processor may, for example, support a virtual address size of 32 bits. In such an embodiment, block 1006 may represent a series of calculations in which the least significant bits (e.g. 32 bits) of the virtual address may be calculated, and any carry from the least significant bits may be carried into a calculation of the most significant bits of the virtual address.

The interpreter may then perform the operation specified by the non-native instruction (block 1008). If the non-native instruction includes a memory operand as a source operand, the interpreter may read the memory operand from the effective address calculated at block 1006. Other operands may be read from the non-native architected state. The operation may include an arithmetic operation, a logical operation, a shift, a move to another storage location, etc. The native processor architecture may support an operand size smaller than the operand size of the instruction. In such cases, performing the operation may include multiple calculations on portions of the operand to calculate the result. Additionally, if the non-native instruction updates one of the registers storing information used to generate the operating mode, the consistency checks of table 90 may be applied by the interpreter. Also, the interpreter may update the LMA indication if the LME indication or the PG indication is changed by a non-native instruction.

The interpreter determines if the non-native instruction resulted in an exception (decision block 1010). Generally, exceptions may occur throughout the execution of the operations specified by the non-native instruction. For example, accessing a source memory operand may result in a page fault before any of the actual instruction operation is performed. During the operations, various architecturally-defined exceptions may also occur. The interpreter may interrupt processing of the non-native instruction upon detecting an exception, and may branch to exception handler instructions (block 1012). The exception handler may be native code or non-native code, as desired. If the non-native processor architecture specifies the update of any architected state when an exception is taken (e.g. various control registers may store the address of the exception causing instruction, the exception reason, etc.), the interpreter may update the non-native architected state as defined.

It is noted that the interpreter software is executing on the native processor, and thus is subject to experiencing exceptions as defined in the native processor architecture. These exceptions may generally be different the exceptions detected by the interpreter software, which are exceptions experienced by the non-native code being interpreted according to the non-native processor architecture.

If no exception occurs during emulation of the non-native instruction, the interpreter may update the non-native architected state according to the definition of the non-native instruction (block 1014). Finally, the interpreter may calculate the next non-native instruction fetch address to fetch the next instruction (block 1016). The next fetch address may be sequential to the current non-native instruction, or may be a different address (e.g. if the current non-native instruction is a taken branch, the next fetch address may be the target address of the branch instruction).

It is noted that the interpreter may operate in protected mode, using virtual addresses. In other words, the effective address calculated at block 1006 may be a virtual address which is translated by the translation mechanism specified by the non-native processor architecture to a physical address. The processor may include a translation lookaside buffer (TLB) used to cache translations. The processor may either support reload of the TLB from the non-native translation tables (page tables), or may take an exception on a TLB miss to allow software reload of the TLB.

Figure 13:
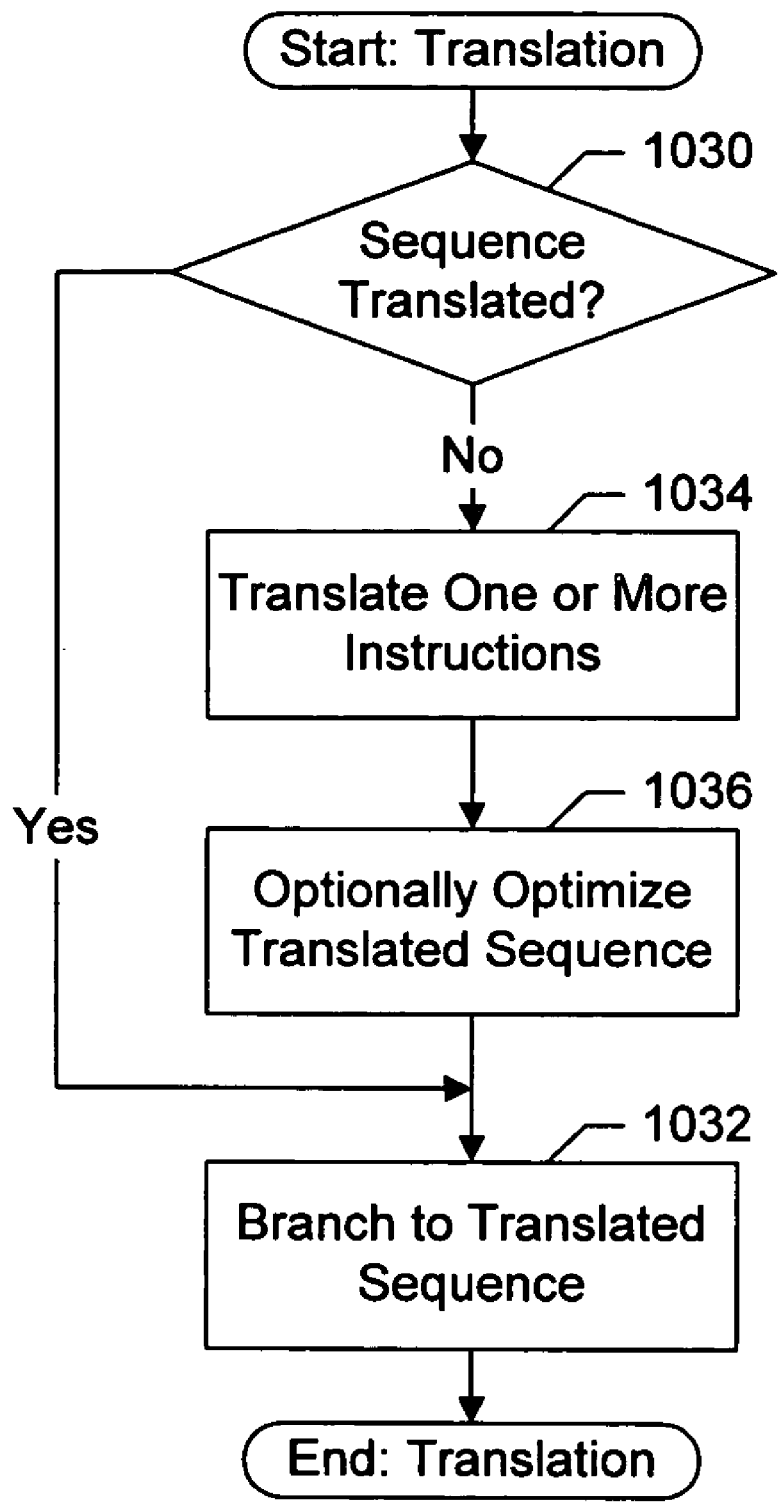
FIG. 13 is a flowchart illustrating one embodiment of a translator.

Turning to FIG. 13, a flowchart illustrating an exemplary translator which may be used to translate non-native instructions in the non-native processor architecture to native instructions in the native processor architecture. Other embodiments are possible and contemplated. While the blocks shown are illustrated in a particular order for ease of understanding, any suitable order may be used. Furthermore, blocks may be performed in parallel, as desired.

The blocks shown in FIG. 13 illustrate the translation of one non-native code sequence responsive to a fetch address for the first instruction in the non-native code sequence. The code translator may translate any number of non-native instructions to produce a translated code sequence having native instructions. For example, the translator may translate from the initial non-native instruction to a basic block boundary (i.e. a branch instruction). Alternatively, the translator may speculatively translate two or more basic blocks or may translate up to a maximum number of non-native or resulting native instructions, if desired.

Generally, the translator may maintain a translation cache which stores translated code sequences previously produced by the translator. The translation cache may identify translated code sequences by the fetch address of the first non-native instruction in the corresponding non-native code sequences. Thus, the translator may determine if a translated code sequence corresponding to the fetch address is stored in the translation cache (decision block 1030). If there is a translated code sequence in the translation cache, the translator may cause the processor to branch to that translated code sequence (block 1032). On the other hand, if there is no translated code sequence, the translator may translate one or more non-native instructions from the non-native code sequence into native instructions in a translated code sequence (block 1034).

Generally, the translator may translate each non-native instruction into one or more native instructions which, when executed, may perform the same operation on the non-native architected state that the non-native instruction would have performed. The translator may generally perform the same decoding of instructions as is performed by the interpreter (block 1002 in FIG. 12) to determine what operations may need to be performed. For example, if the native processor architecture is a load/store architecture in which memory operands are accessed using explicit load/store instructions and other instruction use only register operands, load and store instructions may be used to access the memory operands and other instructions may be used to perform the explicit operation of a non-native instruction having a memory operand. The translated instructions may make use of temporary registers to hold intermediate values corresponding to the execution of the non-native instruction. Additionally, the translated instructions may access the non-native architected state to retrieve operands and may update the non-native architected state with the final results of the non-native instruction. Generally, the native instructions corresponding to the non-native instruction may perform all of the operations defined for the instruction (e.g. blocks 1006, 1008, 1010, 1014, and 1016 in FIG. 12).

Once the translator has determined to terminate translation and save the translated sequence for execution, the translator may optionally optimize the translated code sequence (block 1036). The optimizations may include reordering the translated instructions for quicker execution, eliminating redundancies (e.g. redundant memory references, which may occur if multiple non-native instructions in the source code sequence accessed the same memory location), etc. Any suitable set of optimizations may be used. The resulting translated code sequence may then be stored into the translation cache. Additionally, the processor may branch to the translated code sequence and execute the sequence (block 1032).

It is noted that, while the above description may refer to accessing and/or updating non-native architected state, including various registers, the non-native architected state may be stored in any suitable fashion. For example, architected registers may actually be stored in memory locations, as highlighted above. The mapping of architected registers from the non-native processor architecture to memory locations may be used in either of the interpreter or the translator embodiments, or combinations thereof, to locate the non-architected state used during execution of the non-native instruction or affected by the execution of the non-native instruction. Thus, instructions which access the non-native architected state may perform memory reads/writes or register reads/writes, as the case may be.

Figure 14:
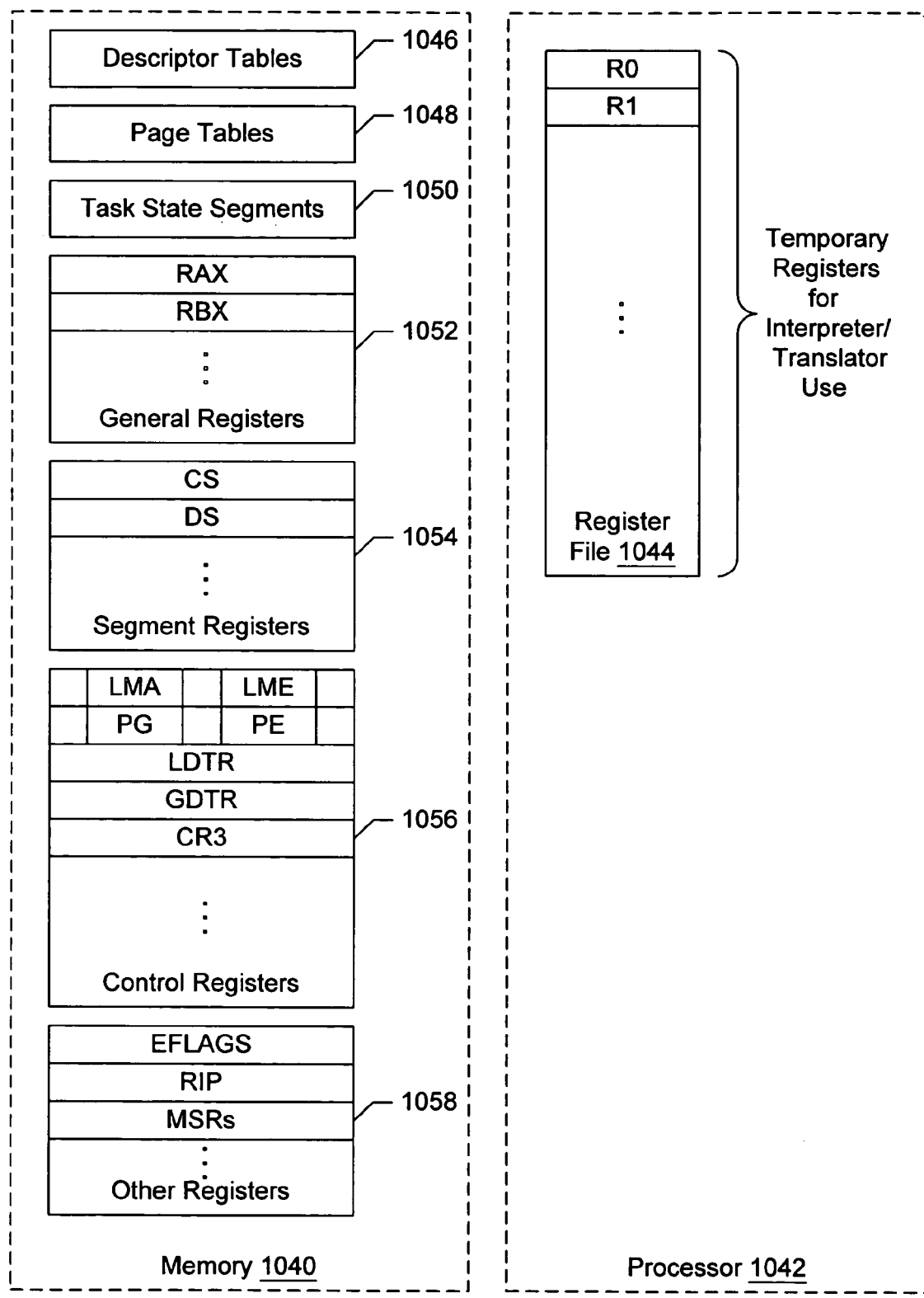
FIG. 14 is a block diagram illustrating one embodiment of mapping non-native architected state.

Turning next to FIG. 14, a block diagram illustrating one exemplary mapping of non-native architected state to either memory locations in a memory 1040 or to processor resources in a native processor 1042. Native processor 1042 includes a register file 1044 including the architected general registers of the native processor architecture. Any number of registers may be provided.

In the embodiment of FIG. 14, all of the non-native architected state is mapped to memory 1040. For example, descriptor tables 1046 (which may include a global descriptor table, a local descriptor table, and an interrupt descriptor table), page tables 1048 (which store virtual to physical address translations), task state segments 1050, general registers 1052, segment registers 1054, control registers 1056, and other registers 1058 may represent non-native architected state.

Thus, in the embodiment of FIG. 14, to access any non-native architected state, a memory access may be performed. For example, if a non-native instruction has one of the general registers as an operand, the interpreter or translated native instruction performs a memory access to the memory location mapped to that general register to access or update that general register. The registers in register file 1044 may be used by the interpreter or translator as temporary registers to hold intermediate results or for other local interpreter/translator state.

General registers 1052 may include integer general registers (e.g. RAX, RBX, etc. as described above), the additional integer general registers defined by the REX prefix byte, floating point registers, Streaming Single Instruction, Multiple Data (SIMD) Extension (SSE) registers, and the additional SSE registers defined by the REX prefix byte.

Segment registers 1054 may include storage locations corresponding to the segment registers 24 shown in FIG. 1 above.

Control registers 1056 may include storage locations corresponding to various control registers defined in the non-native processor architecture. For example, control registers storing the LMA, LME, PG and PE bits, as well as the LDTR and GDTR registers and the CR3 register (which stores the base address of the page tables 1048) are shown. Other control registers may be included as well.

Other registers 1058 includes any remaining architected registers. For example, the EFLAGS register (which stores condition code information), the instruction pointer (RIP) register (which stores the address of the instruction to be executed), and the model specific registers (MSRs) may be included in other registers 1058.

Figure 15:
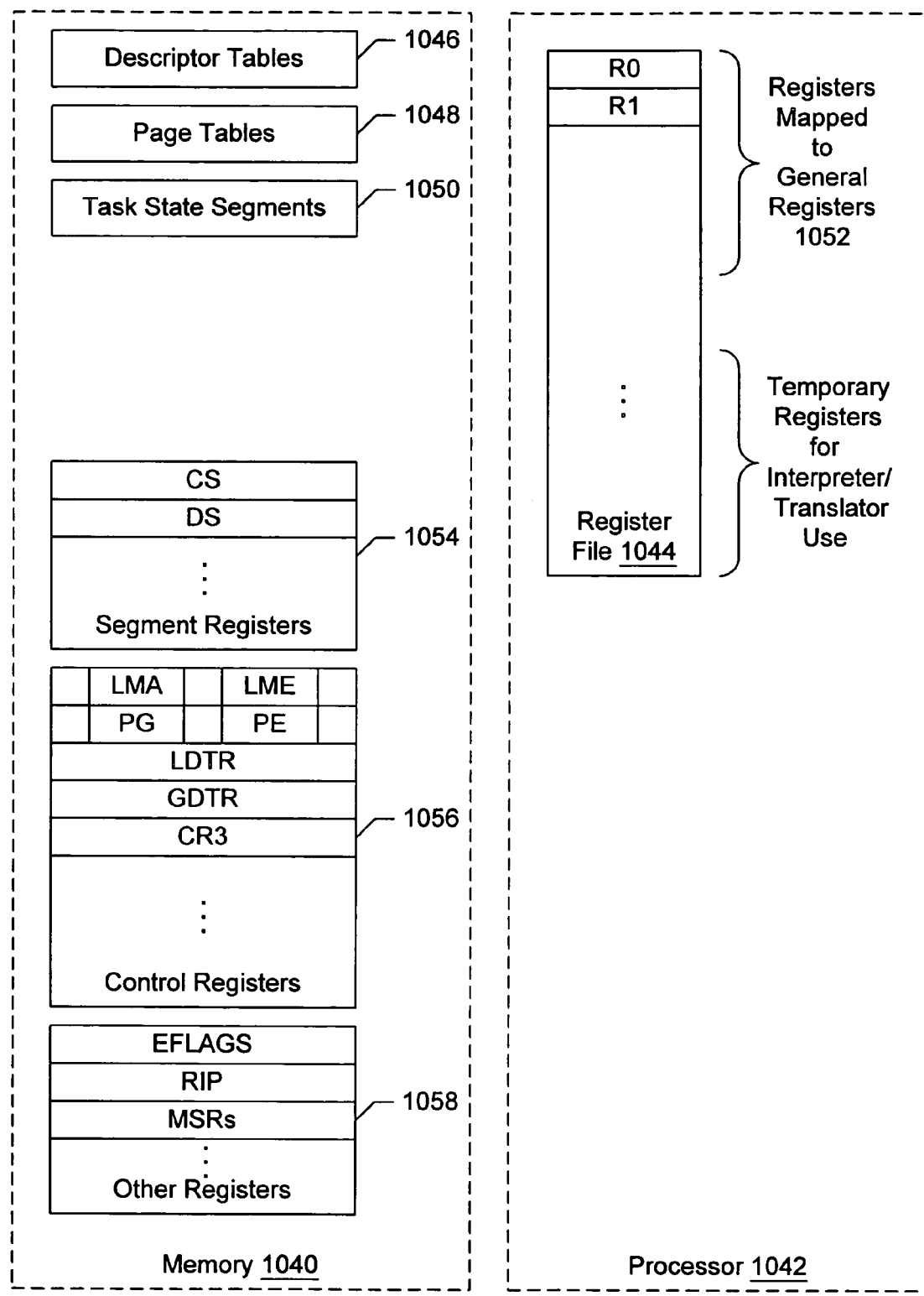
FIG. 15 is a block diagram illustrating a second embodiment of mapping non-native architected state.

While the example of FIG. 14 maps all of the non-native architected state to memory 1040, other embodiments may implement other mappings. In FIG. 15, for example, some of the general registers in register file 1044 are mapped to the general registers 1052. Accordingly, if a non-native instruction has a general register as an operand, the interpreter accesses the corresponding register in register file 1044. Similarly, the translator generates a translated instruction having the corresponding register in register file 1044 as an operand. Other architected state may still be accessed via memory operations in the embodiment of FIG. 15. Other registers in register file 1044 which are not assigned to non-native architected state may again be used as temporary registers for interpreter or translator use, as described above.

While the embodiment of FIG. 15 illustrates mapping the general registers 1052 to registers in register file 1044, any other non-native architected state may be mapped to registers in register file 1044. For example, any of segment registers 1054, control registers 1056, or other registers 1058 (or portions of any of these registers) may be mapped to register file 1044, as desired.

Figure 16:
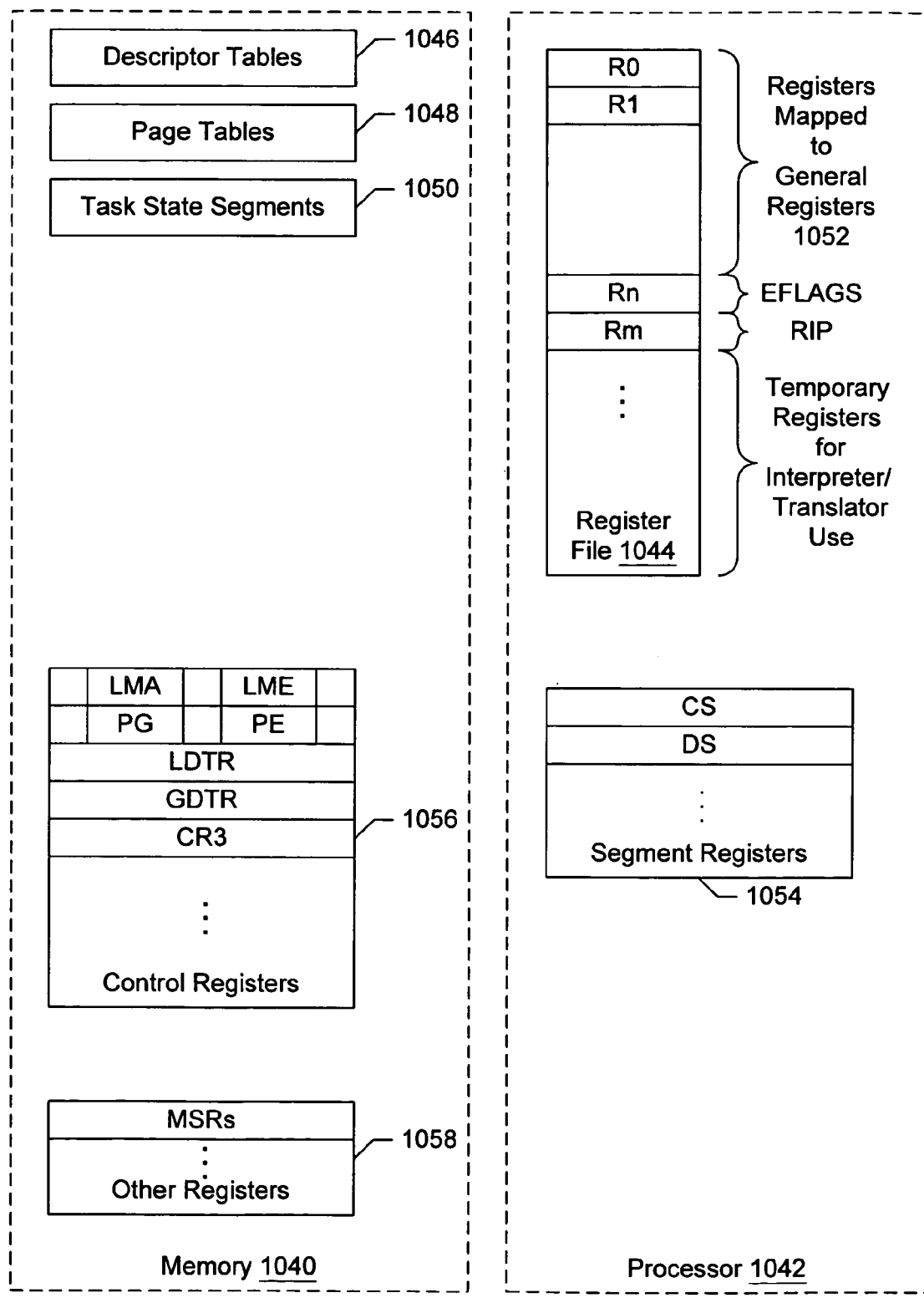
FIG. 16 is a block diagram illustrating a third embodiment of mapping non-native architected state.

FIG. 16 illustrates another example in which the general registers 1052 and the EFLAGS and RIP registers are mapped to registers in register file 1044. Additionally, in the example of FIG. 16, the segment registers 1054 are implemented in hardware in processor 1042. More specifically, processor 1042 may not only implement storage for segment registers 1054, but may also include logic to generate the operating mode for instructions based on the information in the segment registers. Furthermore, for compatibility modes, the logic may include limit checks and attribute checks to ensure that accesses to the segment attempted by the non-native instructions (or the non-native instructions in the interpreter or the translated code sequence which correspond to the non-native instructions) are permitted.

Similarly, other embodiments may implement various control registers 1056 or other registers 1058 in hardware, including corresponding logic to act on the contents of the registers as defined in the non-native architecture. Generally, various embodiments of processor 1042 may implement any non-native architected state in hardware. Certain architected state may generally be implemented in memory since the non-native processor architecture defines the state to be in memory (e.g. descriptor tables 1046, pages tables 1048, and task state segments 1050). Such memory-based architected state may be cached in caches within processor 1042 (e.g. TLBs for page table information, hidden segment register portions for segment descriptor information, etc.).

As the above discussion illustrates, the non-native architected state may be stored in any suitable storage location. Generally, a storage location is a location capable of storing a value. Suitable storage locations may include, in various embodiments, a memory location, a general register mapped to the non-native architected state, or a special purpose register (which may include additional hardware to interpret the contents of the register), depending upon the embodiment. Additionally, suitable storage locations could include a scratch pad RAM (such as a portion of a cache predetermined to be used as scratch pad RAM).

Figure 17:
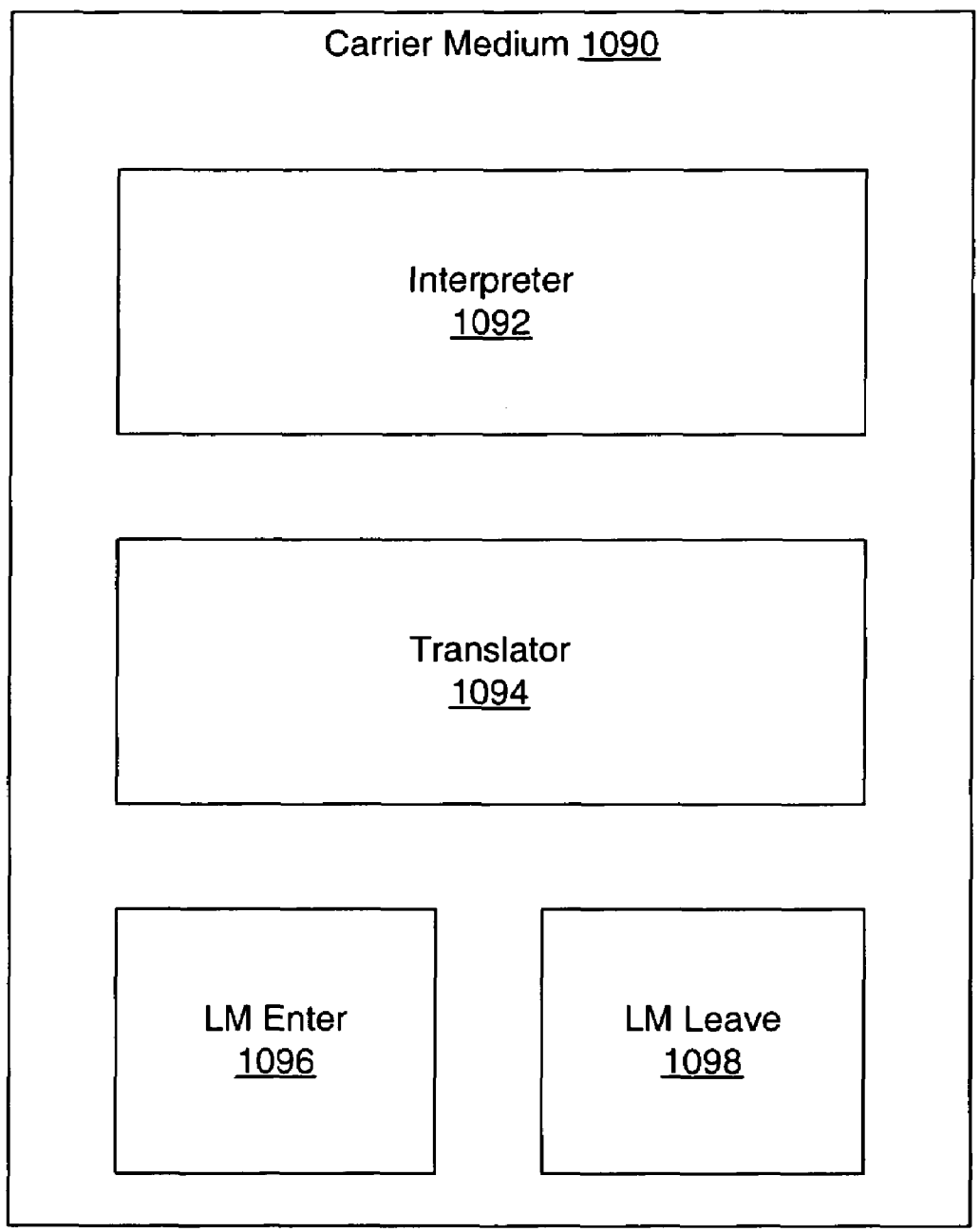
FIG. 17 is a block diagram of one embodiment of a carrier medium.

FIG. 17 is a block diagram of one embodiment of a carrier medium 1090. Other embodiments are possible and contemplated. In the embodiment of FIG. 17, carrier medium 1090 stores an interpreter program 1092, a translator program 1094, a long mode (LM) enter routine 1096, and LM leave routine 1098.

Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc. Carrier medium 1090 may thus be coupled to a computer system including processor 1042 or may be part of a computer system including processor 1042. Computer systems including processor 1042 may be of any construction. For example, computer systems similar to those shown in FIGS. 18 and 19 may be suitable.

Interpreter program 1090 may operate according to the flowchart of FIG. 12. Translator program 1094 may operate according to the flowchart of FIG. 13. Generally, interpreter program 1092 and translator program 1094 may each comprise code sequences including native instructions.

LM enter routine 1096 may comprise native or non-native instructions which, when executed, perform the operations of FIG. 10. LM leave routine 1098 may comprise native or non-native instructions which, when executed, perform the operations of FIG. 11.

Computer Systems

Figure 18:
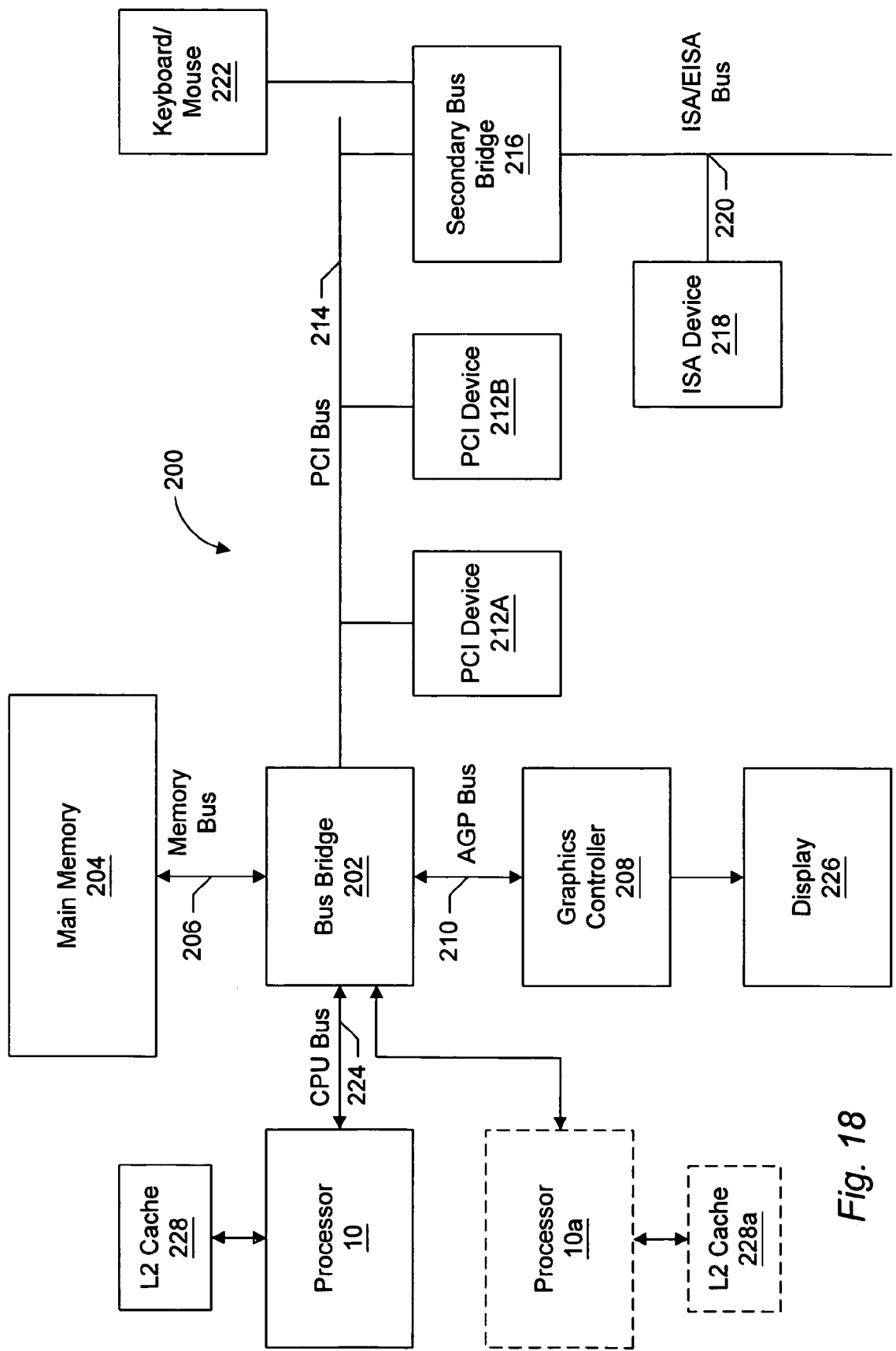
FIG. 18 is a block diagram of one embodiment of a computer system including the processor shown in FIG. 1.

Turning now to FIG. 18, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through a CPU bus 224 and to an optional L2 cache 228. Together, CPU bus 224 and the interface to L2 cache 228 may comprise an external interface to which external interface unit 18 may couple.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM) or Rambus DRAM (RDRAM) may be suitable.

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may be connected to bus bridge 202 via an independent bus (as shown in FIG. 18) or may share CPU bus 224 with processor 10. Furthermore, processor 10a may be coupled to an optional L2 cache 228a similar to L2 cache 228.

Figure 19:
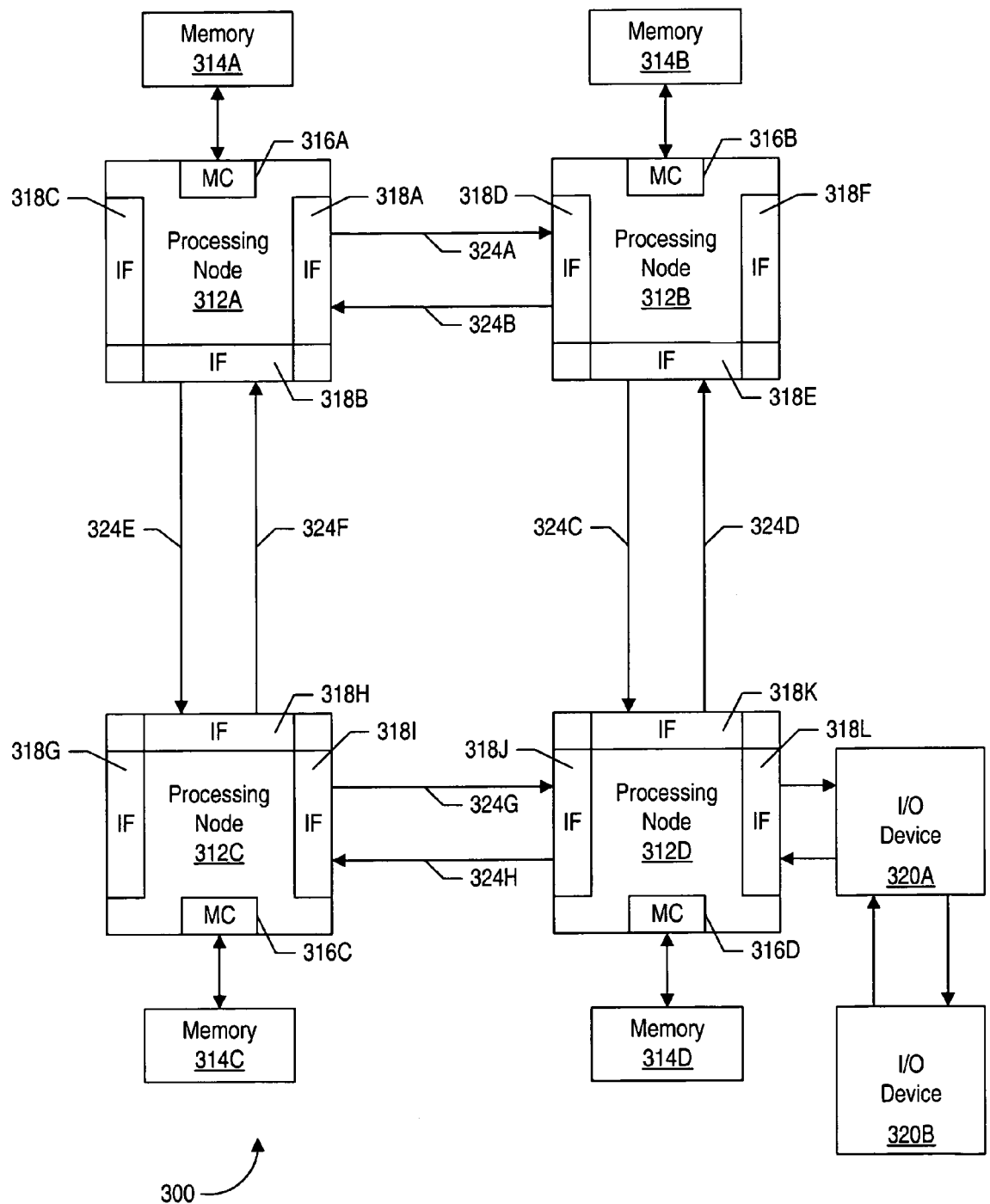
FIG. 19 is a block diagram of another embodiment of a computer system including the processor shown in FIG. 1.

Turning now to FIG. 19, another embodiment of a computer system 300 is shown. Other embodiments are possible and contemplated. In the embodiment of FIG. 19, computer system 300 includes several processing nodes 312A, 312B, 312C, and 312D. Each processing node is coupled to a respective memory 314A–314D via a memory controller 316A–316D included within each respective processing node 312A–312D. Additionally, processing nodes 312A–312D include interface logic used to communicate between the processing nodes 312A–312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g. devices 320A–320B in a daisy chain configuration) via interface logic 318L. Other processing nodes may communicate with other I/O devices in a similar fashion.

Processing nodes 312A–312D implement a packet-based link for inter-processing node communication. In the present embodiment, the link is implemented as sets of unidirectional lines (e.g. lines 324A are used to transmit packets from processing node 312A to processing node 312B and lines 324B are used to transmit packets from processing node 312B to processing node 312A). Other sets of lines 324C–324H are used to transmit packets between other processing nodes as illustrated in FIG. 19. Generally, each set of lines 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 19. Any suitable routing algorithm may be used. Other embodiments of computer system 300 may include more or fewer processing nodes then the embodiment shown in FIG. 19.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A–312D, in addition to a memory controller and interface logic, may include one or more processors. Broadly speaking, a processing node comprises at least one processor and may optionally include a memory controller for communicating with a memory and other logic as desired. More particularly, each processing node 312A–312D may comprise one or more copies of processor 10. External interface unit 18 may includes the interface logic 318 within the node, as well as the memory controller 316.

Memories 314A–314D may comprise any suitable memory devices. For example, a memory 314A–314D may comprise one or more RAMBUS DRAMs (RDRAMs), synchronous DRAMs (SDRAMs), static RAM, etc. The address space of computer system 300 is divided among memories 314A–314D. Each processing node 312A–312D may include a memory map used to determine which addresses are mapped to which memories 314A–314D, and hence to which processing node 312A–312D a memory request for a particular address should be routed. In one embodiment, the coherency point for an address within computer system 300 is the memory controller 316A–316D coupled to the memory storing bytes corresponding to the address. In other words, the memory controller 316A–316D is responsible for ensuring that each memory access to the corresponding memory 314A–314D occurs in a cache coherent fashion. Memory controllers 316A–316D may comprise control circuitry for interfacing to memories 314A–314D. Additionally, memory controllers 316A–316D may include request queues for queuing memory requests.

Generally, interface logic 318A–318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A–320B may be any suitable I/O device. For example, I/O devices 320A–320B may include network interface cards, video accelerators, audio cards, hard or floppy disk drives or drive controllers, SCSI (Small Computer Systems Interface) adapters and telephony cards, modems, sound cards, and a variety of data acquisition cards such as GPIB or field bus interface cards.

Numerous variations and modifications will become apparent to those skilled in the art once the above disclosure is fully appreciated. It is intended that the following claims be interpreted to embrace all such variations and modifications.

What is claimed is:

1. An apparatus comprising:
a first storage location configured to store a first indication, the first storage location addressable by a first instruction defined by a processor architecture, wherein the first indication is an enable indication defined in the processor architecture to indicate whether or not a first mode defined in the processor architecture is to be enabled;
a second storage location configured to store a second indication, the second storage location addressable by a second instruction defined by the processor architecture, the second instruction being different from the first instruction, and wherein the second indication is a paging indication defined in the processor architecture to indicate whether or not paging is enabled;
a third storage location configured to store a mode indication, the mode indication indicative of whether or not the first mode is active, and wherein the first mode permits an address size greater than 32 bits and an operand size greater than 32 bits; and
a processor configured to generate the mode indication responsive to the first indication and the second indication.

2. The apparatus as recited in claim 1 wherein the mode indication indicates that the first mode is active if the enable indication is in an enabled state and the paging indication indicates that paging is enabled.

3. The apparatus as recited in claim 1 wherein the processor is configured to check a status of one or more indications including the enable indication and the paging indication when changing one of the one or more indications to ensure that the change is permitted by the processor architecture.

4. The apparatus as recited in claim 3 wherein the processor is configured to signal an exception instead of changing the one of the one or more indications if the change is not permitted.

5. The apparatus as recited in claim 3 wherein, if the enable indication is changed from a disabled state to an enabled state, the processor checks that the paging indication indicates that paging is disabled for the change to be permitted.

6. The apparatus as recited in claim 3 wherein, if the enable indication is changed from an enabled state to a disabled state, the processor checks that the paging indication indicates that paging is disabled for the change to be permitted.

7. The apparatus as recited in claim 3 wherein, if the paging indication is changed from indicating that paging is disabled to indicating that paging is enabled, the change is not permitted if the enable indication is in an enabled state and another indication indicates that physical address extension is disabled.

8. The apparatus as recited in claim 3 wherein the one of the one or more indications is an indication of whether or not physical address extension is enabled, and wherein the change is not permitted if the enable indication is in an enabled state.

9. The apparatus as recited in claim 1 further comprising a fourth storage location configured to store a segment selector identifying a segment descriptor including a first operating mode indication and a second operating mode indication, and wherein the processor is configured to generate an operating mode responsive to the mode indication, the first operating mode indication, and the second operating mode indication.

10. The apparatus as recited in claim 1 wherein the first storage location is located within a first register defined by the processor architecture, and wherein the second storage location is located within a second register defined by the processor architecture.

11. The apparatus as recited in claim 10 wherein the third storage location is located within the first register.

12. The apparatus as recited in claim 10 wherein the first register and the second register are incorporated within the processor.

13. The apparatus as recited in claim 12 further comprising a circuit coupled to the first register and the second register, wherein the circuit is configured to generate the mode indication for storage in the third storage location.

14. The apparatus as recited in claim 1 wherein the processor implements the processor architecture.

15. The apparatus as recited in claim 1 wherein the processor emulates the processor architecture.

16. The apparatus as recited in claim 15 wherein the processor executes interpreter software for interpreting instructions defined in the processor architecture.

17. The apparatus as recited in claim 15 wherein the processor executes translator software for translating instructions defined in the processor architecture to instructions executable by the processor.

18. The apparatus as recited in claim 15 wherein the processor executes a combination of: (i) interpreter software for interpreting instructions defined in the processor architecture; and (ii) translator software for translating instructions defined in the processor architecture to instructions executable by the processor.

19. A processor comprising:
a first register configured to store a first indication, the first register addressable by a first instruction, wherein the first indication is an enable indication defined in a processor architecture of the processor to indicate whether or not a first mode defined in the processor architecture is to be enabled;
a second register configured to store a second indication, the second register addressable by a second instruction different from the first instruction, wherein the second indication is a paging indication defined in the processor architecture to indicate whether or not paging is enabled; and
a circuit coupled to the first register and the second register, wherein the circuit is configured to generate a mode indication responsive to the first indication and the second indication, wherein the mode indication is indicative of whether or not the first mode is active, and wherein the first mode permits an address size greater than 32 bits and an operand size greater than 32 bits, and wherein the circuit is configured to store the mode indication in a location addressable by an instruction.

20. The processor as recited in claim 19 the mode indication indicates that the first mode is active if the enable indication is in an enabled state and the paging indication indicates that paging is enabled.

21. The processor as recited in claim 19 wherein the processor is configured to check a status of one or more indications including the enable indication and the paging indication when changing one of the one or more indications to ensure that the change is permitted by the processor architecture.

22. The processor as recited in claim 21 wherein the processor is configured to signal an exception instead of changing the one of the one or more indications if the change is not permitted.

23. The processor as recited in claim 21 wherein, if the enable indication is changed from a disabled state to an enabled state, the processor checks that the paging indication indicates that paging is disabled for the change to be permitted.

24. The processor as recited in claim 21 wherein, if the enable indication is changed from an enabled state to a disabled state, the processor checks that the paging indication indicates that paging is disabled for the change to be permitted.

25. The processor as recited in claim 21 wherein, if the paging indication is changed from indicating that paging is disabled to indicating that paging is enabled, the change is not permitted if the enable indication is in an enabled state and another indication indicates that physical address extension is disabled.

26. The processor as recited in claim 21 wherein the one of the one or more indications is an indication of whether or not physical address extension is enabled, and wherein the change is not permitted if the enable indication is in an enabled state.

27. The processor as recited in claim 19 further comprising a segment register configured to store a segment selector identifying a segment descriptor including a first operating mode indication and a second operating mode indication, and wherein the circuit is configured to generate an operating mode responsive to the mode indication, the first operating mode indication, and the second operating mode indication.

28. The processor as recited in claim 19 wherein the mode indication is also stored in the first register.

29. A computer system comprising the processor as recited in claim 19 and a device configured to communicate between the computer system and another computer system.

30. The computer system as recited in claim 29 wherein the device comprises a modem.

31. The computer system as recited in claim 29 wherein the device comprises a network interface circuit.

32. A method comprising:
  storing a first indication in a first storage location addressable by a first instruction, wherein the first indication is an enable indication defined in a processor architecture to indicate whether or not a first mode defined in the processor architecture is to be enabled;
  storing a second indication in a second storage location addressable by a second instruction, wherein the second indication is a paging indication defined in the processor architecture to indicate whether or not paging is enabled;
  generating a mode indication indicative of whether or not the first mode is active, the generating responsive to the first indication and the second indication, wherein the first mode permits an address size greater than 32 bits and an operand size greater than 32 bits; and
  storing the mode indication in a third addressable storage location.

33. The method as recited in claim 32 the generating comprises generating the mode indication to indicate that the first mode is active if the enable indication is in an enabled state and the paging indication indicates that paging is enabled.

34. The method as recited in claim 32 further comprising checking a status of one or more indications including the enable indication and the paging indication when changing one of the one or more indications to ensure that the change is permitted by the processor architecture.

35. The method as recited in claim 34 further comprising signalling an exception instead of changing the one of the one or more indications if the change is not permitted.

36. The method as recited in claim 34 wherein the checking comprises, if the enable indication is changed from a disabled state to an enabled state, checking that the paging indication indicates that paging is disabled for the change to be permitted.

37. The method as recited in claim 34 wherein the checking comprises, if the enable indication is changed from an enabled state to a disabled state, checking that the paging indication indicates that paging is disabled for the change to be permitted.

38. The method as recited in claim 34 wherein, if the paging indication is changed from indicating that paging is disabled to indicating that paging is enabled, the change is not permitted if the enable indication is in an enabled state and another indication indicates that physical address extension is disabled.

39. The method as recited in claim 34 wherein the one of the one or more indications is an indication of whether or not physical address extension is enabled, and wherein the change is not permitted if the enable indication is in an enabled state.

40. The method as recited in claim 32 further comprising generating an operating mode responsive to the mode indication, a first operating mode indication, and a second operating mode indication, wherein the first operating mode indication and the second operating mode indication are included in a segment descriptor identified by a segment selector stored in a fourth storage location.

41. A processor comprising:
  a first register configured to store an enable indication indicative of whether or not a first mode is to be enabled, the first register addressable by a first instruction;
  a second register configured to store a paging indication indicative of whether or not paging is enabled, the second register addressable by a second instruction different from the first instruction; and
  a circuit coupled to the first register and the second register, wherein the circuit is configured to generate a mode indication responsive to the enable indication and the paging indication, wherein the mode indication is indicative of whether or not a first mode of the processor is active, the first mode permitting an address size greater than 32 bits and an operand size greater than 32 bits, and wherein the circuit is configured to store the mode indication in a location addressable by an instruction.

42. The processor as recited in claim 41 wherein the mode indication indicates that the first mode is active if the enable indication is in an enabled state and the paging indication indicates that paging is enabled.

43. The processor as recited in claim 41 wherein the processor is configured to check a status of one or more indications including the enable indication and the paging indication when changing one of the one or more indications to ensure that the change is permitted.

44. The processor as recited in claim 43 wherein the processor is configured to signal an exception instead of changing the one of the one or more indications if the change is not permitted.

45. The processor as recited in claim 43 wherein, if the enable indication is changed from a disabled state to an enabled state, the processor checks that the paging indication indicates that paging is disabled for the change to be permitted.

46. The processor as recited in claim 43 wherein, if the enable indication is changed from an enabled state to a disabled state, the processor checks that the paging indication indicates that paging is disabled for the change to be permitted.

47. The processor as recited in claim 43 wherein, if the paging indication is changed from indicating that paging is disabled to indicating that paging is enabled, the change is not permitted if the enable indication is in an enabled state and another indication indicates that physical address extension is disabled.

48. The processor as recited in claim 43 wherein the one of the one or more indications is an indication of whether or not physical address extension is enabled, and wherein the change is not permitted if the enable indication is in an enabled state.

49. The processor as recited in claim 41 further comprising a segment register configured to store a segment selector identifying a segment descriptor including a first operating mode indication and a second operating mode indication, and wherein the circuit is configured to generate an operating mode responsive to the mode indication, the first operating mode indication, and the second operating mode indication.

50. The processor as recited in claim 41 wherein the mode indication is also stored in the first register.

51. A computer system comprising the processor as recited in claim 41 and a device configured to communicate between the computer system and another computer system.

52. The computer system as recited in claim 51 wherein the device comprises a modem.

53. The computer system as recited in claim 51 wherein the device comprises a network interface circuit.

54. A computer readable medium storing a plurality of instructions which, when executed:
  responsive to a first instruction, update a first storage location configured to store a first indication, wherein the first indication is an enable indication indicative of whether or not a first mode defined in a processor architecture is to be enabled;
  responsive to a second instruction, update a second storage location configured to store a second indication, wherein the second indication is a paging indication indicative of whether or not paging is enabled;
  generate a mode indication responsive to the first indication and the second indication, the mode indication indicative of whether or not the first mode is active in a processor, wherein the first mode permits an address size greater than 32 bits and an operand size greater than 32 bits; and
  update a third storage location configured to store the mode indication.

55. The computer readable medium as recited in claim 54 wherein the plurality of instructions emulate the first instruction and the second instruction.

56. The computer readable medium as recited in claim 54 wherein the plurality of instructions are executed in place of the first instruction and the second instruction.

57. The computer readable medium as recited in claim 54 wherein the mode indication indicates that the first mode is active if the enable indication is in an enabled state and the paging indication indicates that paging is enabled.

* * * * *

UNITED STATES PATENT AND TRADEMARK OFFICE
CERTIFICATE OF CORRECTION

PATENT NO. : 7,058,791 B1 Page 1 of 1
APPLICATION NO. : 09/824988
DATED : June 6, 2006
INVENTOR(S) : William A. Hughes et al.

It is certified that error appears in the above-identified patent and that said Letters Patent is hereby corrected as shown below:

Col. 28, line 23, after "19" please insert --wherein--.

Signed and Sealed this

Twenty-first Day of November, 2006

JON W. DUDAS
*Director of the United States Patent and Trademark Office*